United States Patent
Ma et al.

(10) Patent No.: US 11,997,669 B2
(45) Date of Patent: May 28, 2024

(54) RADIO RESOURCE CONTROL ACTION TIME

(71) Applicant: QUALCOMM Incorporated, San Diego, CA (US)

(72) Inventors: Liangping Ma, San Diego, CA (US); Xiao Feng Wang, San Diego, CA (US); Umesh Phuyal, San Diego, CA (US); Alberto Rico Alvarino, San Diego, CA (US); Bharat Shrestha, San Diego, CA (US); Peter Gaal, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/359,489

(22) Filed: Jun. 25, 2021

(65) Prior Publication Data

US 2022/0417958 A1    Dec. 29, 2022

(51) Int. Cl.
*H04W 72/1263* (2023.01)
*H04W 8/24* (2009.01)
(Continued)

(52) U.S. Cl.
CPC ......... *H04W 72/1263* (2013.01); *H04W 8/24* (2013.01); *H04W 72/0446* (2013.01); *H04W 72/535* (2023.01); *H04W 76/27* (2018.02)

(58) Field of Classification Search
CPC ......... H04W 72/1263; H04W 72/0446; H04W 72/1257; H04W 76/27; H04W 8/24
(Continued)

(56) References Cited

U.S. PATENT DOCUMENTS

| 10,104,585 | B2 * | 10/2018 | Park | H04W 36/0069 |
| 2015/0146628 | A1 * | 5/2015 | Shi | H04W 76/27 |
| | | | | 370/329 |

(Continued)

FOREIGN PATENT DOCUMENTS

| WO | WO-2015169332 A1 * | 11/2015 | G06F 11/1425 |
| WO | WO-2021034313 A1 | 2/2021 | |

OTHER PUBLICATIONS

Huawei., et al., "Discussion on Support of Conditional PSCell Change/Addition", 3GPP TSG-Ran WG3 Meeting #112-e, R2-2010125, 3rd Generation Partnership Project (3GPP), Mobile Competence Centre, 650, Route Des Lucioles, F-06921 Sophia-Antipolis Cedex, France, vol. RAN WG3, No. Online, Nov. 2, 20202-Nov. 13, 2020, Oct. 22, 2020, XP051941553, sections 1-3, 8 Pages.

(Continued)

*Primary Examiner* — Intekhaab A Siddiquee

(74) *Attorney, Agent, or Firm* — Holland & Hart LLP/QUALCOMM Incorporated

(57) ABSTRACT

Methods, systems, and devices for wireless communications are described. A user equipment (UE) may receive a radio resource control (RRC) reconfiguration message from a base station including a configuration for communicating with the base station, and the base station may transmit an RRC reconfiguration complete message to the base station (e.g., in response to the RRC reconfiguration message). The UE may then apply the configuration in the RRC reconfiguration message for communicating with the base station after transmitting the RRC reconfiguration complete message. That is, the UE may delay application of the configuration in the RRC reconfiguration message until after the UE transmits the RRC reconfiguration complete message. Using these techniques, ambiguity between the base station and the UE on when the configuration is applied by the UE may be (Continued)

minimized, resulting in improved throughput and reduced latency in a wireless communications system.

56 Claims, 18 Drawing Sheets

(51) Int. Cl.
  *H04W 72/0446* (2023.01)
  *H04W 72/50* (2023.01)
  *H04W 76/27* (2018.01)

(58) Field of Classification Search
  USPC .......................................................... 370/329
  See application file for complete search history.

(56) References Cited

U.S. PATENT DOCUMENTS

2015/0365856 A1* 12/2015 Krishnamoorthy ... H04W 76/27
  370/331
2020/0213067 A1   7/2020 Cirik et al.

OTHER PUBLICATIONS

International Search Report and Written Opinion—PCT/US2022/031398—ISA/EPO—dated Sep. 21, 2022 (2105430WO).

* cited by examiner

RADIO RESOURCE CONTROL ACTION TIME

INTRODUCTION

The following relates to wireless communications, including managing a radio resource control procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include receiving, from a base station, a radio resource control reconfiguration message including an indication of a configuration for communicating with the base station, transmitting, to the base station, a radio resource control reconfiguration complete message, applying the configuration in the radio resource control reconfiguration message after transmitting the radio resource control reconfiguration complete message, and communicating with the base station using the applied configuration.

An apparatus for wireless communication at a UE is described. The apparatus may include a processor and memory coupled to the processor. The processor and memory may be configured to receive, from a base station, a radio resource control reconfiguration message including an indication of a configuration for communicating with the base station, transmit, to the base station, a radio resource control reconfiguration complete message, apply the configuration in the radio resource control reconfiguration message after transmitting the radio resource control reconfiguration complete message, and communicate with the base station using the applied configuration.

Another apparatus for wireless communication at a UE is described. The apparatus may include means for receiving, from a base station, a radio resource control reconfiguration message including an indication of a configuration for communicating with the base station, means for transmitting, to the base station, a radio resource control reconfiguration complete message, means for applying the configuration in the radio resource control reconfiguration message after transmitting the radio resource control reconfiguration complete message, and means for communicating with the base station using the applied configuration.

A non-transitory computer-readable medium storing code for wireless communication at a UE is described. The code may include instructions executable by a processor to receive, from a base station, a radio resource control reconfiguration message including an indication of a configuration for communicating with the base station, transmit, to the base station, a radio resource control reconfiguration complete message, apply the configuration in the radio resource control reconfiguration message after transmitting the radio resource control reconfiguration complete message, and communicate with the base station using the applied configuration.

In some examples of the method, apparatuses, and non-transitory computer-readable medium described herein, applying the configuration may include operations, features, means, or instructions for waiting for a first time window to expire before applying the configuration and applying the configuration in a second time window following the first time window, where the first time window and the second time window include a radio resource control window.

In some examples of the method, apparatuses, and non-transitory computer-readable medium described herein, a duration of the radio resource control window may be based on a one-way propagation delay for transmissions from the UE to the base station plus a remaining radio resource control procedure delay.

Some examples of the method, apparatuses, and non-transitory computer-readable medium described herein may further include operations, features, means, or instructions for verifying that the configuration in the radio resource control reconfiguration message may be compliant, where the remaining radio resource control procedure delay may be equal to a radio resource control procedure delay minus a duration for verifying that the configuration may be compliant.

In some examples of the method, apparatuses, and non-transitory computer-readable medium described herein, a duration of the radio resource control window may be based on a one-way propagation delay for transmissions from the UE to the base station.

In some examples of the method, apparatuses, and non-transitory computer-readable medium described herein, a duration of the second time window may be equal to a remaining radio resource control procedure delay.

In some examples of the method, apparatuses, and non-transitory computer-readable medium described herein, applying the configuration may include operations, features, means, or instructions for generating a first protocol stack using the configuration in the radio resource control reconfiguration message for communicating with the base station, where the first protocol stack replaces a second protocol stack generated using a previous configuration for communicating with the base station.

Some examples of the method, apparatuses, and non-transitory computer-readable medium described herein may further include operations, features, means, or instructions for transmitting, to the base station upon receiving the radio resource control reconfiguration message, an acknowledgment indicating that the radio resource control reconfiguration message may be successfully received by the UE.

Some examples of the method, apparatuses, and non-transitory computer-readable medium described herein may further include operations, features, means, or instructions for receiving, from the base station, an indication to apply the configuration in the radio resource control reconfiguration message after transmitting the radio resource control reconfiguration complete message.

Some examples of the method, apparatuses, and non-transitory computer-readable medium described herein may further include operations, features, means, or instructions for transmitting, to the base station, an indication of a capability of the UE, where receiving the indication to apply the configuration after transmitting the radio resource control reconfiguration complete message may be based on the capability of the UE.

Some examples of the method, apparatuses, and non-transitory computer-readable medium described herein may further include operations, features, means, or instructions for transmitting a request for the indication to apply the configuration after transmitting the radio resource control reconfiguration complete message based on at least one quality of service requirement at the UE.

Some examples of the method, apparatuses, and non-transitory computer-readable medium described herein may further include operations, features, means, or instructions for communicating with the base station using a previous configuration until the UE starts to apply the configuration in the radio resource control reconfiguration message.

In some examples of the method, apparatuses, and non-transitory computer-readable medium described herein, applying the configuration may include operations, features, means, or instructions for applying the configuration in the radio resource control reconfiguration message after a duration at the UE for processing the radio resource control reconfiguration message plus a one-way propagation delay for transmissions from the UE to the base station.

In some examples of the method, apparatuses, and non-transitory computer-readable medium described herein, applying the configuration may include operations, features, means, or instructions for applying the configuration in the radio resource control reconfiguration message after a one-way propagation delay for transmissions from the base station to the UE plus a maximum of a duration at the UE for processing the radio resource control reconfiguration message and a one-way propagation delay for transmissions from the UE to the base station.

In some examples of the method, apparatuses, and non-transitory computer-readable medium described herein, applying the configuration may include operations, features, means, or instructions for applying the configuration in the radio resource control reconfiguration message after a duration at the UE for processing the radio resource control reconfiguration message plus a one-way propagation delay for transmissions from the base station to the UE plus a one-way propagation delay for transmissions from the UE to the base station.

Some examples of the method, apparatuses, and non-transitory computer-readable medium described herein may further include operations, features, means, or instructions for verifying that the configuration in the radio resource control reconfiguration message may be compliant and transmitting, in the radio resource control reconfiguration complete message, a flag indicating that the UE may be to apply the configuration in the radio resource control reconfiguration message.

In some examples of the method, apparatuses, and non-transitory computer-readable medium described herein, verifying that the configuration may be compliant may include operations, features, means, or instructions for applying the configuration in the radio resource control reconfiguration message, the method further including and reverting to a previous configuration after verifying that the configuration may be compliant.

In some examples of the method, apparatuses, and non-transitory computer-readable medium described herein, verifying that the configuration may be compliant may include operations, features, means, or instructions for generating a first protocol stack using the configuration in the radio resource control reconfiguration message for communicating with the base station, where the first protocol stack replaces a second protocol stack generated using a previous configuration for communicating with the base station.

Some examples of the method, apparatuses, and non-transitory computer-readable medium described herein may further include operations, features, means, or instructions for communicating with the base station using the second protocol stack until a time that the configuration in the radio resource control reconfiguration message may be applied, deleting the second protocol stack, and communicating with the base station using the first protocol stack after the time that the configuration in the radio resource control reconfiguration message may be applied.

In some examples of the method, apparatuses, and non-transitory computer-readable medium described herein, the UE and the base station may be operating in a non-terrestrial network.

A method for wireless communication at a base station is described. The method may include transmitting, to a UE, an indication to apply a configuration in a radio resource control reconfiguration message after the UE transmits a radio resource control reconfiguration complete message, transmitting, to the UE, the radio resource control reconfiguration message including the configuration for communicating with the UE, receiving, from the UE, the radio resource control reconfiguration complete message, and communicating with the UE using the configuration in the radio resource control reconfiguration message based on receiving the radio resource control reconfiguration complete message.

An apparatus for wireless communication at a base station is described. The apparatus may include a processor and memory coupled to the processor. The processor and memory may be configured to transmit, to a UE, an indication to apply a configuration in a radio resource control reconfiguration message after the UE transmits a radio resource control reconfiguration complete message, transmit, to the UE, the radio resource control reconfiguration message including the configuration for communicating with the UE, receive, from the UE, the radio resource control reconfiguration complete message, and communicate with the UE using the configuration in the radio resource control reconfiguration message based on receiving the radio resource control reconfiguration complete message.

Another apparatus for wireless communication at a base station is described. The apparatus may include means for transmitting, to a UE, an indication to apply a configuration in a radio resource control reconfiguration message after the UE transmits a radio resource control reconfiguration complete message, means for transmitting, to the UE, the radio resource control reconfiguration message including the configuration for communicating with the UE, means for receiving, from the UE, the radio resource control reconfiguration complete message, and means for communicating with the UE using the configuration in the radio resource control reconfiguration message based on receiving the radio resource control reconfiguration complete message.

A non-transitory computer-readable medium storing code for wireless communication at a base station is described. The code may include instructions executable by a processor to transmit, to a UE, an indication to apply a configuration in a radio resource control reconfiguration message after the UE transmits a radio resource control reconfiguration complete message, transmit, to the UE, the radio resource control reconfiguration message including the configuration for communicating with the UE, receive, from the UE, the radio resource control reconfiguration complete message, and communicate with the UE using the configuration in the radio resource control reconfiguration message based on receiving the radio resource control reconfiguration complete message.

Some examples of the method, apparatuses, and non-transitory computer-readable medium described herein may further include operations, features, means, or instructions for scheduling communications with the UE using a previous configuration in a first time window after transmitting the radio resource control reconfiguration message and avoiding scheduling communications with the UE in a second time window following the first time window.

In some examples of the method, apparatuses, and non-transitory computer-readable medium described herein, a duration of the first time window may be based on a one-way propagation delay for transmissions from the base station to the UE plus a remaining radio resource control procedure delay, and a duration of the second time window may be based on a one-way propagation delay for transmissions between the UE to the base station minus the remaining radio resource control procedure delay.

In some examples of the method, apparatuses, and non-transitory computer-readable medium described herein, the remaining radio resource control procedure delay may be equal to a radio resource control procedure delay minus a duration at the UE for verifying that the configuration may be compliant.

In some examples of the method, apparatuses, and non-transitory computer-readable medium described herein, a duration of the first time window may be based on a one-way propagation delay for transmissions from the base station to the UE, and a duration of the second time window may be based on the one-way propagation delay for transmissions from the UE to the base station.

In some examples of the method, apparatuses, and non-transitory computer-readable medium described herein, a duration of the first time window may be based on a duration at the UE for generating the radio resource control reconfiguration complete message, and a duration of the second time window may be based on a one-way propagation delay for transmissions from the base station to the UE plus a one-way propagation delay for transmissions from the UE to the base station.

Some examples of the method, apparatuses, and non-transitory computer-readable medium described herein may further include operations, features, means, or instructions for communicating with UE using a previous configuration for a duration after transmitting the radio resource control reconfiguration message.

In some examples of the method, apparatuses, and non-transitory computer-readable medium described herein, the duration in which to communicate with the UE using the previous configuration includes a duration at the UE for processing the radio resource control reconfiguration message plus a one-way propagation delay for transmissions from the UE to the base station.

In some examples of the method, apparatuses, and non-transitory computer-readable medium described herein, the duration in which to communicate with the UE using the previous configuration includes a one-way propagation delay for transmissions from the base station to the UE plus a maximum of a duration at the UE for processing the radio resource control reconfiguration message and a one-way propagation delay for transmissions from the UE to the base station.

In some examples of the method, apparatuses, and non-transitory computer-readable medium described herein, the duration in which to communicate with the UE using the previous configuration includes a duration at the UE for processing the radio resource control reconfiguration message plus a one-way propagation delay for transmissions from the base station to the UE plus a one-way propagation delay for transmissions from the UE to the base station.

Some examples of the method, apparatuses, and non-transitory computer-readable medium described herein may further include operations, features, means, or instructions for receiving, from the UE, an acknowledgment indicating that the radio resource control reconfiguration message may be successfully received by the UE.

Some examples of the method, apparatuses, and non-transitory computer-readable medium described herein may further include operations, features, means, or instructions for receiving, from the UE, an indication of a capability of the UE, where transmitting the indication to apply the configuration after the UE transmits the radio resource control reconfiguration complete message may be based on the capability of the UE.

Some examples of the method, apparatuses, and non-transitory computer-readable medium described herein may further include operations, features, means, or instructions for receiving, from the UE, a request for the indication to apply the configuration after the UE transmits the radio resource control reconfiguration complete message based on at least one quality of service requirement at the UE.

Some examples of the method, apparatuses, and non-transitory computer-readable medium described herein may further include operations, features, means, or instructions for receiving, in the radio resource control reconfiguration complete message, a flag indicating that the UE may be to apply the configuration in the radio resource control reconfiguration message.

DETAILED DESCRIPTION

Figure 1:
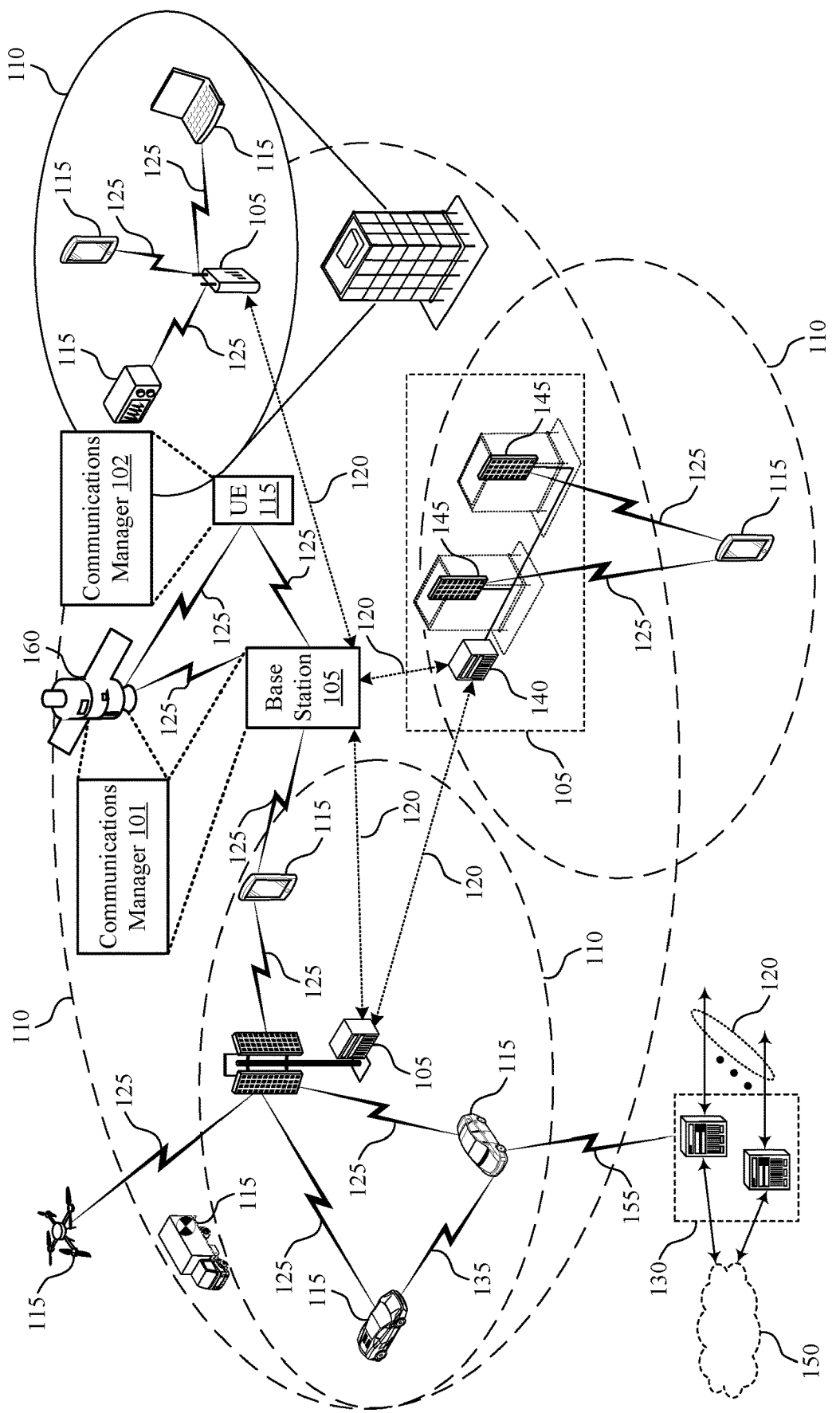
FIG. 1 illustrates an example of a wireless communications system that supports radio resource control (RRC) action time in accordance with one or more aspects of the present disclosure.

In some wireless communications systems, a base station may use RRC signaling to signal a configuration to a UE for the UE to use to communicate with the base station. In some cases, the base station may decide to update the configuration at the UE, and the base station may transmit an RRC reconfiguration message to the UE to update the configuration at the UE. Once the UE receives the RRC reconfiguration message and applies an updated configuration in the RRC reconfiguration message, the UE may transmit an RRC reconfiguration complete message to the base station to indicate that reconfiguration is complete at the UE. The UE may also transmit an acknowledgment (ACK) to the base station upon receiving the RRC reconfiguration message to indicate that the UE successfully received the RRC reconfiguration message.

In some cases, the UE may successfully decode the RRC reconfiguration message, transmit a hybrid automatic repeat request (HARQ) ACK, and apply the updated configuration if the updated configuration is valid. The UE may then transmit the RRC reconfiguration complete message to the base station. In some cases, the UE may fail in decoding the RRC reconfiguration message and may continue to use a current configuration and may not transmit a HARQ ACK nor an RRC reconfiguration complete message to the base station. It may take at least one round-trip time (RTT) for the base station to receive or detect the lack of the HARQ ACK and/or the RRC reconfiguration complete message. During this at least one RTT period, there may be some ambiguity between the base station and the UE on whether the updated configuration is applied by the UE and, if so, when the updated configuration is applied.

In some cases, if a propagation delay associated with communications between the UE and the base station is minimal, a duration between a time when the updated configuration is applied by the UE and a time when the updated configuration is used by the base station may also be minimal. As a result, the ambiguity between the base station and the UE on when the updated configuration is applied by the UE may be minimal. The propagation delay may correspond to a duration between a time at which a UE transmits a message and a time at which a base station receives the message, and vice versa. A one-way propagation delay may refer to a propagation delay for a transmission from a UE to a base station or from a base station to a UE, and a two-way propagation delay may refer to a propagation delay for a transmission from a UE to a base station plus a propagation delay for a transmission from a base station to a UE.

In some wireless communications systems, however, there may be a larger propagation delay associated with communications between a UE and a base station. For instance, in a non-terrestrial network (NTN), a base station (e.g., satellite) may be far away from a UE, and a propagation delay between the UE and the base station may be large (e.g., ranging from tens of milliseconds (ms) to hundreds of ms). In such systems, the duration of ambiguity between the base station and the UE on when the updated configuration is applied by the UE may be substantial. Further, before the base station receives the ACK, the base station may not be able to determine whether the UE received the RRC reconfiguration message with the updated configuration (e.g., since the UE may or may not be able to correctly decode the RRC reconfiguration message), and the base station may not switch to the updated configuration.

In an example, if the UE applies the updated configuration before transmitting an RRC reconfiguration complete message, and the base station uses a previous (e.g., old) configuration until the base station receives the RRC reconfiguration complete message, the UE and the base station may use different configurations for a duration that it takes the RRC reconfiguration complete message to reach the base station (e.g., the propagation delay). In this example, if the base station schedules communications with the UE when the base station and the UE are using different configurations, the base station may not be able to receive or decode transmissions from the UE, and vice versa (e.g., due to the UE and the base station communicating on different bandwidth parts (BWPs) according to different configurations). Accordingly, the ambiguity between the base station and the UE may result in reduced throughput and increased latency.

As described herein, a wireless communications system may support efficient techniques for removing or minimizing the ambiguity between a UE and a base station on when an updated configuration is applied by the UE. In particular, a UE may apply the updated configuration received in an RRC reconfiguration message after the UE transmits an RRC reconfiguration complete message to the base station. That is, the UE may delay application of the updated configuration. Because the UE may delay application of the updated configuration, the UE may allow time for the base station to receive the RRC reconfiguration complete message before applying the updated configuration. As a result, in some examples, the UE and the base station may start using the updated configuration at the same time or close to the same time.

By removing or minimizing the ambiguity between the base station and the UE, throughput between a UE and a base station may be improved since the base station and UE may, for example, communicate using a previous configuration before switching to the updated configuration. Further, the base station and the UE may avoid wasting transmissions and resources on attempting to communicate using different configurations, resulting in reduced latency.

Aspects of the disclosure are initially described in the context of wireless communications systems. Examples of processes and signaling exchanges that support an RRC action time are then described. Aspects of the disclosure are further illustrated by and described with reference to apparatus diagrams, system diagrams, and flowcharts that relate to RRC action time.

FIG. 1 illustrates an example of a wireless communications system 100 that supports RRC action time in accordance with one or more aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

A base station 105 may include a communications manager 101. The communications manager 101 may transmit, to a UE 115, an indication to apply a configuration in an RRC reconfiguration message after the UE 115 transmits an RRC reconfiguration complete message. The communications manager 101 may transmit, to the UE, the RRC reconfiguration message including the configuration for communicating with the UE. The communications manager 101 may receive, from the UE, an RRC reconfiguration complete message. The communications manager 101 may communicate with the UE using the configuration in the RRC reconfiguration message based on receiving the RRC reconfiguration complete message.

A UE 115 may include a communications manager 102. The communications manager 102 may receive, from a base station 105, an RRC reconfiguration message including an indication of a configuration for communicating with the base station 105. The communications manager 102 may transmit, to the base station 105, an RRC reconfiguration complete message. The communications manager 102 may apply the configuration in the RRC reconfiguration message after transmitting the RRC reconfiguration complete message. The communications manager 102 may communicate with the base station 105 using the applied configuration.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

An NTN in wireless communications system 100 may utilize one or more satellites 160 (e.g., low earth orbit (LEO) or medium earth orbit (MEO) satellites). In some implementations, a satellite 160 may broadly refer to a high-altitude platform such as an extra-atmospheric orbiting satellite or an intra-atmosphere satellite including, for example, a high-altitude balloon or aircraft. The satellites 160 may relay communications between base stations 105 and UEs 115. In some examples, the satellites 160 may include aspects of base stations 105 or may perform functions ascribed herein to base stations 105. Each satellite 160 may be associated with a geographic coverage area 110 in which communications with various UEs 115 are supported. For instance, each satellite may provide communication coverage for a respective geographic coverage area 110 via communication links 125, and communication links 125 between a satellite 160 and a UE 115 may utilize one or more carriers.

In an NTN, communication links 125 shown in wireless communications system 100 may include upstream transmissions from a UE 115 to a network node (for example, to a satellite 160 or to a base station 105 via a satellite 160), or downstream transmissions to a UE 115 from a network node (for example, from a satellite 160 or from a base station 105 via a satellite 160). In some implementations, transmissions from the ground (for example, from a UE 115 or base station 105) to a satellite 160 may be referred to as uplink transmissions, and transmissions from a satellite 160 to the ground (for example, to a UE 115 or base station 105) may be referred to as downlink transmissions. Thus, depending on whether a gateway (for example, a base station 105) may be collocated with (for example, included in) a satellite 160 or at the ground, either upstream or downstream transmissions may include a mix of uplink and downlink transmissions. Downstream transmissions may also be called forward link transmissions while upstream transmissions may also be called reverse link transmissions. In some implementations, a geographic coverage area 110 of a satellite 160 may be an area associated with a transmission beam of the satellite 160 and may be referred to as a beam footprint.

The geographic coverage area 110 for a base station 105 or a satellite 160 may be divided into sectors making up a portion of the geographic coverage area, and each sector may be associated with a cell. For example, each base station 105 or satellite 160 may provide communication coverage for a macro cell, a small cell, a hot spot, or other types of cells, or various combinations thereof. In some examples, a base station 105 or a satellite 160 may be movable and therefore provide communication coverage for a moving geographic coverage area 110. In some examples, different geographic coverage areas associated with different technologies may overlap, but the different geographic coverage areas 110 may be supported by the same base station 105 or satellite 160. In other examples, the overlapping geographic coverage areas 110 associated with different technologies may be supported by different base stations 105 or satellites 160. The wireless communications system 100 may include, for example, a heterogeneous LTE/LTE-A/LTE-A Pro network, an NR network, or an NTN network in which different types of base stations 105 or satellites 160 provide coverage for various geographic coverage areas (e.g., using the same or different radio access technologies).

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ feedback may include an ACK indicating that a message is received successfully or a negative ACK (ACK) indicating that a device failed to receive or decode a message. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a base station 105 may use RRC signaling to signal a configuration to a UE 115 for the UE 115 to use to communicate with the base station 105. In some cases, the base station 105 may decide to update the configuration at the UE 115, and the base station 105 may transmit an RRC reconfiguration message to the UE 115 to update the configuration at the UE 115. Once the UE 115 receives the RRC reconfiguration message and applies an updated configuration in the RRC reconfiguration message, the UE 115 may transmit an RRC reconfiguration complete message to the base station 105 to indicate that reconfiguration is complete at the UE 115. The UE 115 may also transmit an ACK to the base station 105 upon receiving the RRC reconfiguration message to indicate that the UE 115 successfully received the RRC reconfiguration message.

Figure 2:
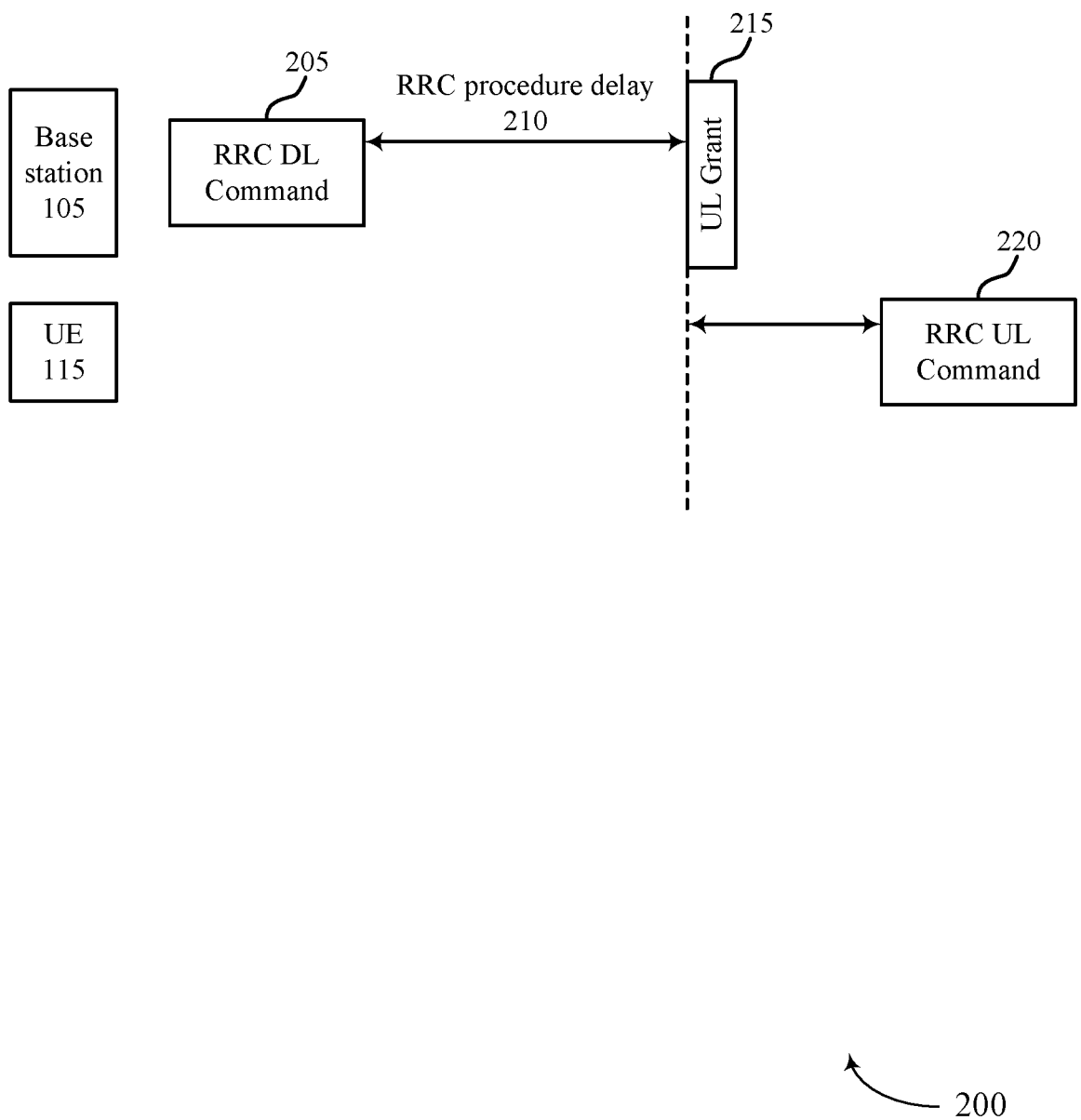
FIG. 2 illustrates an example of an RRC procedure in accordance with one or more aspects of the present disclosure.

FIG. 2 illustrates an example of an RRC procedure 200 in accordance with one or more aspects of the present disclosure. In the example of FIG. 2, a base station 105 may transmit an RRC downlink command 205 to a UE 115. The UE 115 may be configured with an RRC procedure delay 210 (e.g., 10 ms) during which the UE may process the RRC downlink command 205 and apply a configuration in the RRC downlink command 205. The UE 115 may then receive an uplink grant 215 from the base station granting resources for the RRC uplink command 220, and the UE 115 may transmit the RRC uplink command 220 to the base station 105. In one or more aspects, the RRC procedure delay 210 (e.g., a performance requirement, indicating an amount of time that the UE 115 may take to apply the configuration in the RRC downlink command 205) may be expressed as a time (e.g., in ms) from the end of reception of a network-to-UE message (e.g., RRC downlink command 205) on the UE physical layer up to when the UE 115 may be ready for reception of the uplink grant 215 for a UE-to-network response message (e.g., RRC uplink command 220) with no access delay other than a TTI alignment (e.g., excluding delays caused by scheduling, a random-access procedure, or physical layer synchronization).

In FIG. 2, the RRC downlink command 205 may be an RRC reconfiguration message including an updated configuration for a UE, and the RRC uplink command 220 may be an RRC reconfiguration complete message. In some cases, because the UE 115 may apply the updated configuration in the RRC reconfiguration message before transmitting the RRC reconfiguration complete message to the base station, the UE 115 may switch to the updated configuration before the base station 105 receives the RRC reconfiguration complete message. And because the base station 105 may start to use the updated configuration after receiving the RRC reconfiguration complete message, there may be a duration during which the UE 115 is using the updated configuration and the base station is using a previous (e.g., old) configuration. That is, there may be some ambiguity between the base station 105 and the UE 115 on when the updated configuration is applied by the UE 115 (e.g., during the RRC procedure delay 210).

Figure 3:
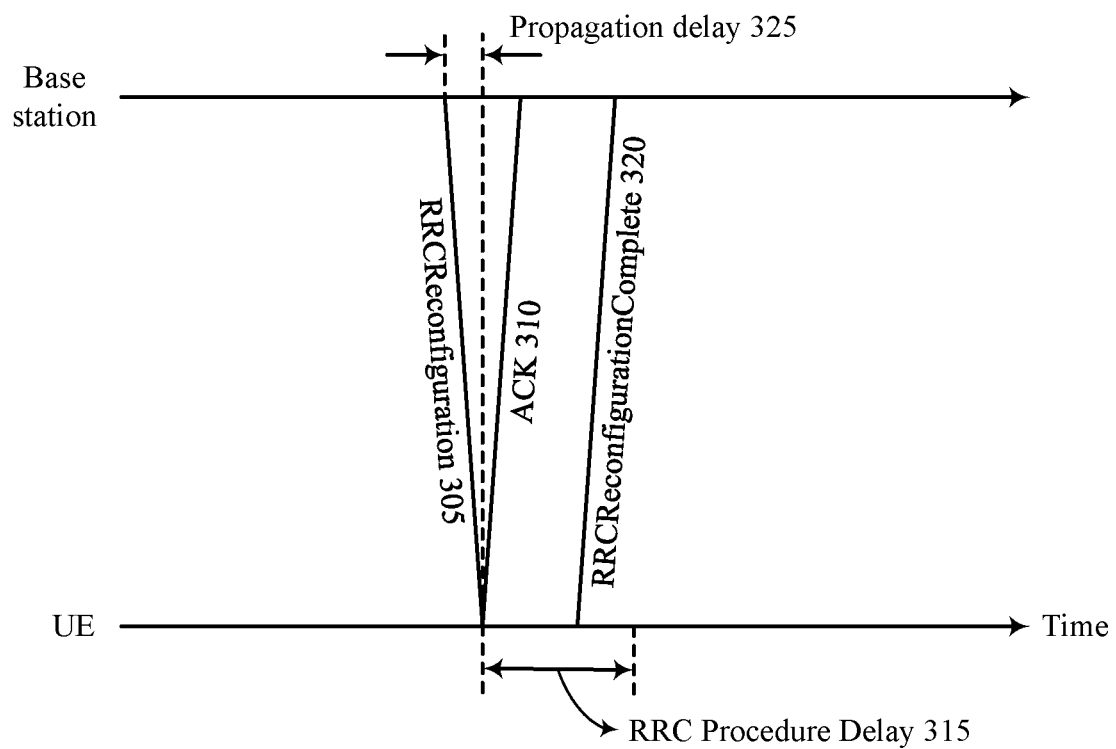
FIG. 3 illustrates an example of RRC signaling in accordance with one or more aspects of the present disclosure.

FIG. 3 illustrates an example of RRC signaling 300 in accordance with one or more aspects of the present disclosure. In FIG. 3, a base station 105 may transmit an RRC reconfiguration message 305 to a UE 115, and the UE 115 may transmit an ACK to the base station 105 indicating that the RRC reconfiguration message 305 was successfully received by the UE 115. The UE 115 may then process the RRC reconfiguration message 305 and apply a configuration in the RRC reconfiguration message 305 during an RRC procedure delay 315. In some cases, the UE 115 may finish applying the configuration before the RRC procedure delay 315 expires, and, in other cases, the UE 115 may finish applying the configuration at the end of the RRC procedure delay 315. In any case, once the UE 115 applies the configuration, the UE 115 may transmit an RRC reconfiguration complete message 320 to the base station 105.

In FIG. 3, because a propagation delay associated with communications between the UE 115 and the base station 105 may be minimal, a duration between a time when the updated configuration is applied by the UE 115 and a time when the updated configuration is used by the base station 105 (e.g., after receiving the RRC reconfiguration complete message 320) may also be minimal. As a result, the ambiguity between the base station 105 and the UE 115 on when the updated configuration is applied by the UE 115 may be minimal.

In some wireless networks (e.g., NTNs), however, there may be a significant propagation delay associated with communications between a UE 115 and a base station 105. In some examples (e.g., for a transparent satellite), the one-way propagation delay for a transmission from the UE 115 to the base station 105 may be equal to a one-way service link delay from the UE 115 to a satellite plus a one-way feeder link delay from the satellite to the base station 105. Similarly, the one-way propagation delay for a transmission from the base station 105 to the UE 115 may be equal to a one-way feeder link delay from the base station 105 to the satellite plus a one-way service link delay from the satellite to the UE 115. In such networks, the ambiguity between the base station 105 and the UE 115 on when the updated configuration is applied by the UE 115 may be substantial. Further, in some examples, even if the base station 105 receives the ACK 310 for the RRC reconfiguration message 305, the ACK 310 (e.g., alone) may not mean that the UE 115 is able to apply the configuration (e.g., in the RRC reconfiguration message 305 or the RRC command), and the base station 105 may have to wait for the RRC reconfiguration complete message 320.

In an example, if the UE 115 applies the updated configuration before transmitting an RRC reconfiguration complete message, and the base station 105 uses a previous (e.g., old) configuration until the base station 105 receives the RRC reconfiguration complete message, the UE 115 and the base station 105 may use different configurations for a duration that it takes the RRC reconfiguration complete message to reach the base station 105 (e.g., the propagation delay). In this example, if the base station 105 schedules communications with the UE 115 when the base station 105 and the UE 115 are using different configurations, the base station 105 may not be able to receive or decode transmissions from the UE 115, and vice versa (e.g., due to the UE 115 and the base station 105 communicating on different bandwidth parts (BWPs) according to different configurations). Accordingly, the ambiguity between the base station 105 and the UE 115 may result in reduced throughput and increased latency. Wireless communications system 100 may support efficient techniques for mitigating the impact of a large period of ambiguity or reduce a period of ambiguity between a UE 115 and a base station 105 on when an updated configuration is applied by a UE 115.

Figure 4:
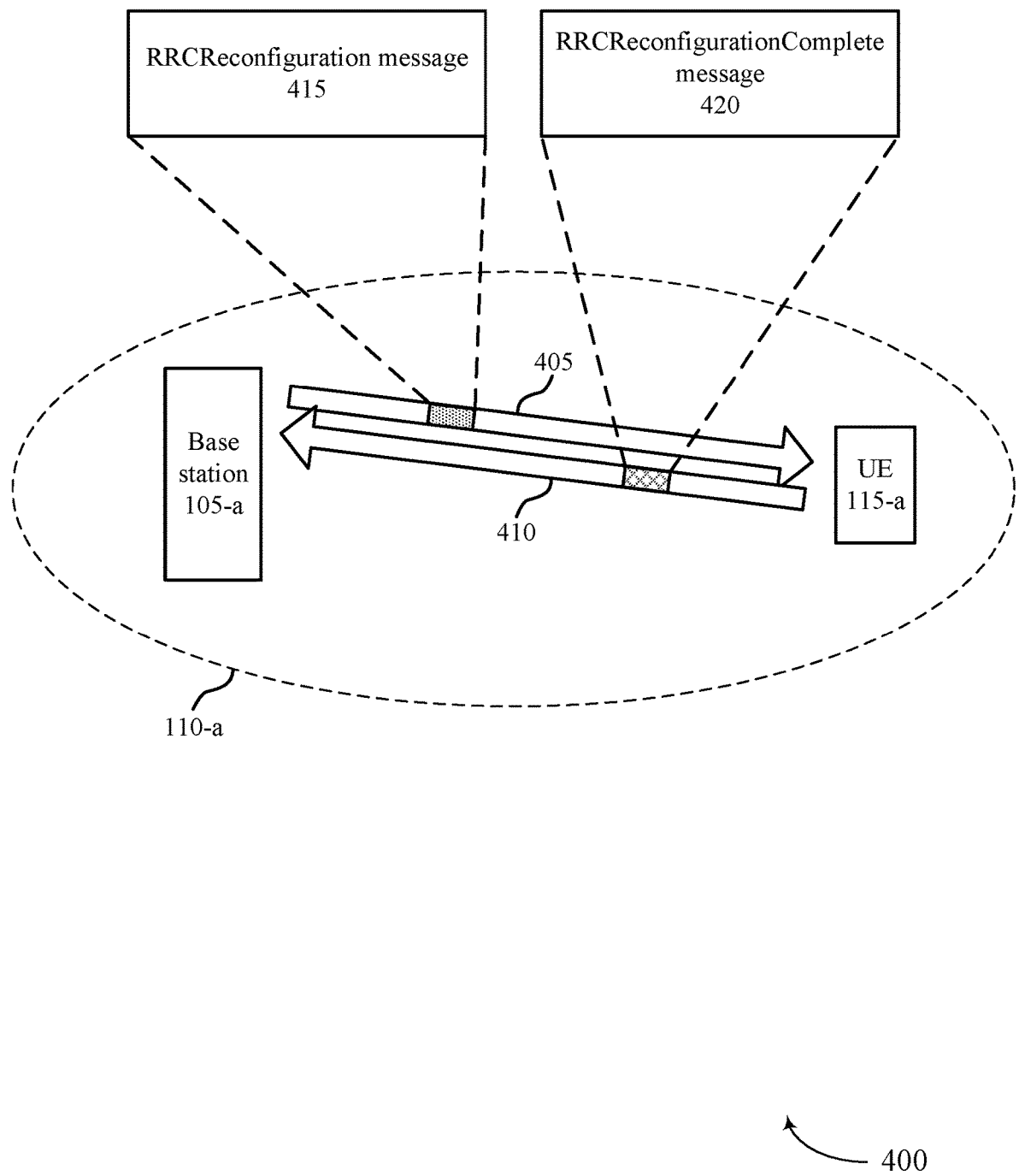
FIG. 4 illustrates an example of a wireless communications system that supports RRC action time in accordance with one or more aspects of the present disclosure.

FIG. 4 illustrates an example of a wireless communications system 400 that supports RRC action time in accordance with one or more aspects of the present disclosure. The wireless communications system 400 includes a UE 115-a, which may be an example of a UE 115 described with reference to FIGS. 1-3. The wireless communications system 400 also includes a base station 105-a, which may be an example of a base station 105 described with reference to FIGS. 1-3. The UE 115-a may communicate with the base station 105-a on resources of a carrier 405 and a carrier 410 (e.g., which may correspond to different or the same carriers). The wireless communications system 400 may implement aspects of the wireless communications system 100. For example, the wireless communications system 400 may support efficient techniques for minimizing ambiguity between the UE 115-a and the base station 105-a on when an updated configuration is applied by the UE 115-a.

The base station 105-a may transmit an RRC reconfiguration message 415 to the UE 115-a indicating a configuration or an updated configuration for the UE 115-a to use to communicate with the base station 105-a. The UE 115-a may then transmit an RRC reconfiguration complete message 420 to the UE 115-a, and, after transmitting the RRC reconfiguration complete message 420, the UE 115-a may apply the updated configuration received in the RRC reconfiguration message 415. That is, the UE 115-a may delay application of the updated configuration. Because the UE 115-a may delay application of the updated configuration, the UE 115-a may allow time for the base station 105-a to receive the RRC reconfiguration complete message 420 before applying the updated configuration. As a result, in some examples, the UE 115-a and the base station 105-a may start using the updated configuration at the same time or close to the same time.

The delayed application of the updated configuration may be referred to as a delayed RRC action mode, and the application of the updated configuration upon receiving the RRC reconfiguration message 415 (e.g., before transmitting the RRC reconfiguration complete message 420) may be referred to as a non-delayed RRC action mode. That is, in the non-delayed RRC action mode, the UE 115-a may transmit the RRC reconfiguration complete message 420 after the UE 115-a applies the updated configuration (e.g., in the RRC reconfiguration message 415 or the RRC command). In the delayed RRC action mode, the UE 115-a may transmit the RRC reconfiguration complete message 420 before the UE 115-a applies the updated configuration (e.g., after checking that the configuration in the RRC reconfiguration message 415 or the RRC command is valid and can be applied without issue).

In some aspects, the UE 115-a may be configured to select between operating in a delayed RRC action mode and operating in a non-delayed RRC action mode. In such cases, the base station 105-a may indicate (e.g., in a system information block (SIB), RRC, a MAC control element (MAC-CE), or downlink control information (DCI)) whether the UE 115-a is to operate in a delayed RRC action mode or a non-delayed RRC action mode. That is, the base station 105-*a* may transmit a control message to the UE 115-*a* indicating whether the UE 115-*a* is to operate in a delayed RRC action mode or a non-delayed RRC action mode. In some cases, the UE 115-*a* may transmit, to the base station 105-*a*, an indication of a capability of the UE 115-*a* to support the delayed RRC action mode (e.g., report its capability of supporting delayed RRC action). The base station 105-*a* may then configure the UE 115-*a* to operate in a delayed RRC action mode or a non-delayed RRC action mode based on the capability of the UE 115-*a* to support the delayed RRC action mode (i.e., the network may configure an RRC action mode based on the report).

In some cases, the UE 115-*a* may also request an RRC action mode (e.g., delayed RRC action mode or non-delayed RRC action mode) based on one or more quality of service (QoS) requirements at the UE 115-*a*. For instance, if the UE 115-*a* expects to support low latency applications, the UE 115-*a* may request to operate in the non-delayed RRC action mode. Alternatively, if the UE 115-*a* prioritizes reliability over latency, the UE 115-*a* may request to operate in the delayed RRC action mode. In some cases, the UE 115-*a* may apply the configuration in the RRC reconfiguration message 415 (e.g., RRC command) by activating a protocol stack (e.g., new protocol stack) generated using the configuration in the RRC reconfiguration message 415 and deleting (e.g., replacing) a protocol stack (e.g., old protocol stack) generated using a previous configuration (e.g., an old configuration). The application of the configuration in the RRC reconfiguration message 415 by activating a new protocol stack to replace an old protocol stack may be referred to as a dual protocol stack concept.

Figure 5:
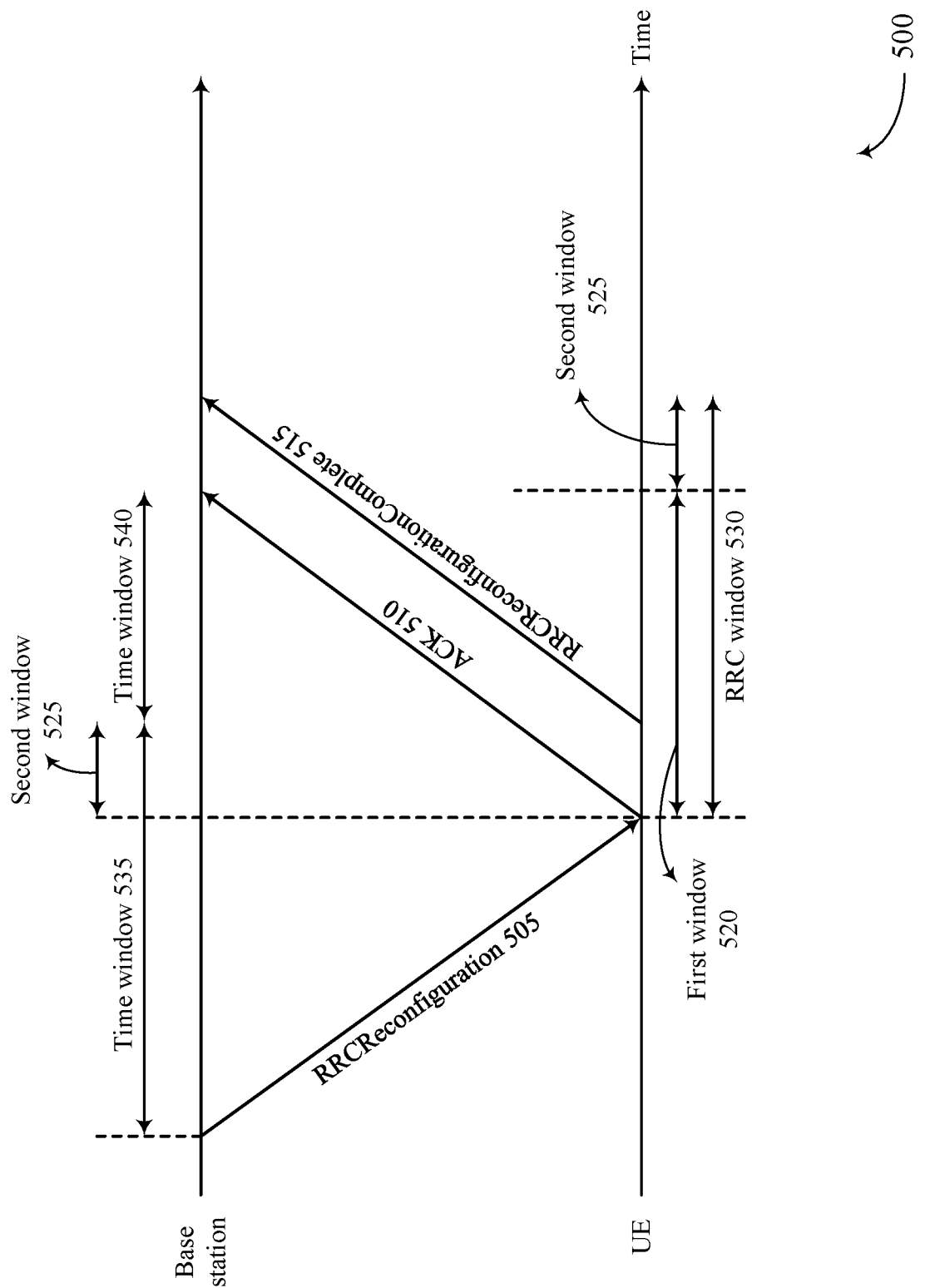
FIG. 5 illustrates an example of a process flow that supports RRC action time in accordance with one or more aspects of the present disclosure.

FIG. 5 illustrates an example of a process flow 500 that supports RRC action time in accordance with one or more aspects of the present disclosure. In FIG. 5, a base station 105 may transmit an RRC reconfiguration message 505 to a UE 115, and, upon receiving the RRC reconfiguration message 505, the UE 115 may transmit an ACK 510 to the base station 105 indicating that the UE 115 successfully received the RRC reconfiguration message 505. In some cases, the UE 115 may also verify that a configuration in the RRC reconfiguration message 505 is valid or compliant (e.g., with the UE 115) and can be applied by the UE 115. The UE 115 may then transmit an RRC reconfiguration complete message 515 to the base station 105 (e.g., in response to the RRC reconfiguration message 505).

After receiving the RRC reconfiguration message 505, the UE 115-*a* may wait for a first time window 520 and then apply a configuration in the RRC reconfiguration message 505 in a second time window 525. A duration of the first time window 520 may be a function of a one-way propagation delay for transmissions from the UE 115 to the base station 105, an RRC procedure delay, or both. A duration of the second time window 525 may be less than, equal to, or greater than the RRC procedure delay. The RRC procedure delay may correspond to a (maximum allowed) time configured at the UE 115 for applying the configuration in the RRC reconfiguration message 505. The first time window 520 and the second time window 525 may together make up or be referred to as an RRC window 530. The RRC window 530 may refer to a duration during which the UE 115-*a* may apply the configuration in the RRC reconfiguration message 505 (e.g., after a delay, in some cases).

In FIG. 5, the RRC window 530 may be based on or equal to a duration of a one way propagation delay for transmissions from the UE 115 to the base station 105 plus a remaining RRC procedure delay. The remaining RRC procedure delay may be equal to an RRC procedure delay minus a duration for verifying that the configuration is valid or compliant and can be applied by the UE 115 or may be equal to the RRC procedure delay. In some cases, a duration of the first time window 520 may be equal to the one-way propagation delay for transmissions from the UE 115 to the base station, and a duration of the second time window 525 may be equal to the remaining RRC procedure delay. Because the UE 115 may delay application of the updated configuration until the second time window 525, the UE 115 may allow time for the base station 105-*a* to receive the RRC reconfiguration complete message 515 before applying the updated configuration. As a result, in some examples, the UE 115 and the base station 105 may start using the updated configuration at the same time or close to the same time. In some aspects (e.g., not shown in FIG. 5), the first time window 520 may be greater than a one-way propagation delay from the UE 115 to the base station 105 (e.g., equal to one RTT). Accordingly, even though the base station 105 and the UE 115 may start using the updated configuration at times one-way propagation delay apart, when a transmission with the updated configuration from the base station 105 arrives at the UE 115, the UE 115 may be or may be close to being on time to start using the updated configuration.

In some aspects, if a UE 115 operates in a delayed RRC action mode and waits until the second time window 525 to apply the updated configuration, it may be appropriate for the base station 105 to adjust scheduling to facilitate the change in configuration at the UE 115 while maximizing throughput. As such, after transmitting the RRC reconfiguration message 505, the base station 105 may continue using a previous (e.g., old) configuration (e.g., RRC configuration) to communicate with the UE 115 during the time window 535 (e.g., a time window A). Because the UE 115 may wait until the second time window 525 to apply the configuration in the RRC reconfiguration message 505, any communications scheduled by the base station 105 during the time window 535 may be scheduled before the UE 115 applies the configuration in the RRC reconfiguration message 505 (e.g., considering the propagation delay). Thus, there may be no ambiguity around which configuration is to be used for the scheduled communications as both the base station 105 and the UE 115 may use the previous configuration for the scheduled communications.

After the time window 535, the base station 105 may stop scheduling communications with the UE 115 during a time window 540 (e.g., time window B). That is, because the UE 115 may apply the configuration in the RRC reconfiguration message 505 in the second time window 525, there may be ambiguity around which configuration the UE 115 is to use at the end of the second time window 525. As such, the base station 105 may avoid scheduling communications (e.g., before receiving the ACK 510) in the time window 540 (e.g., since these communications may be scheduled during or after the second time window 525 due to a propagation delay).

Figure 6:
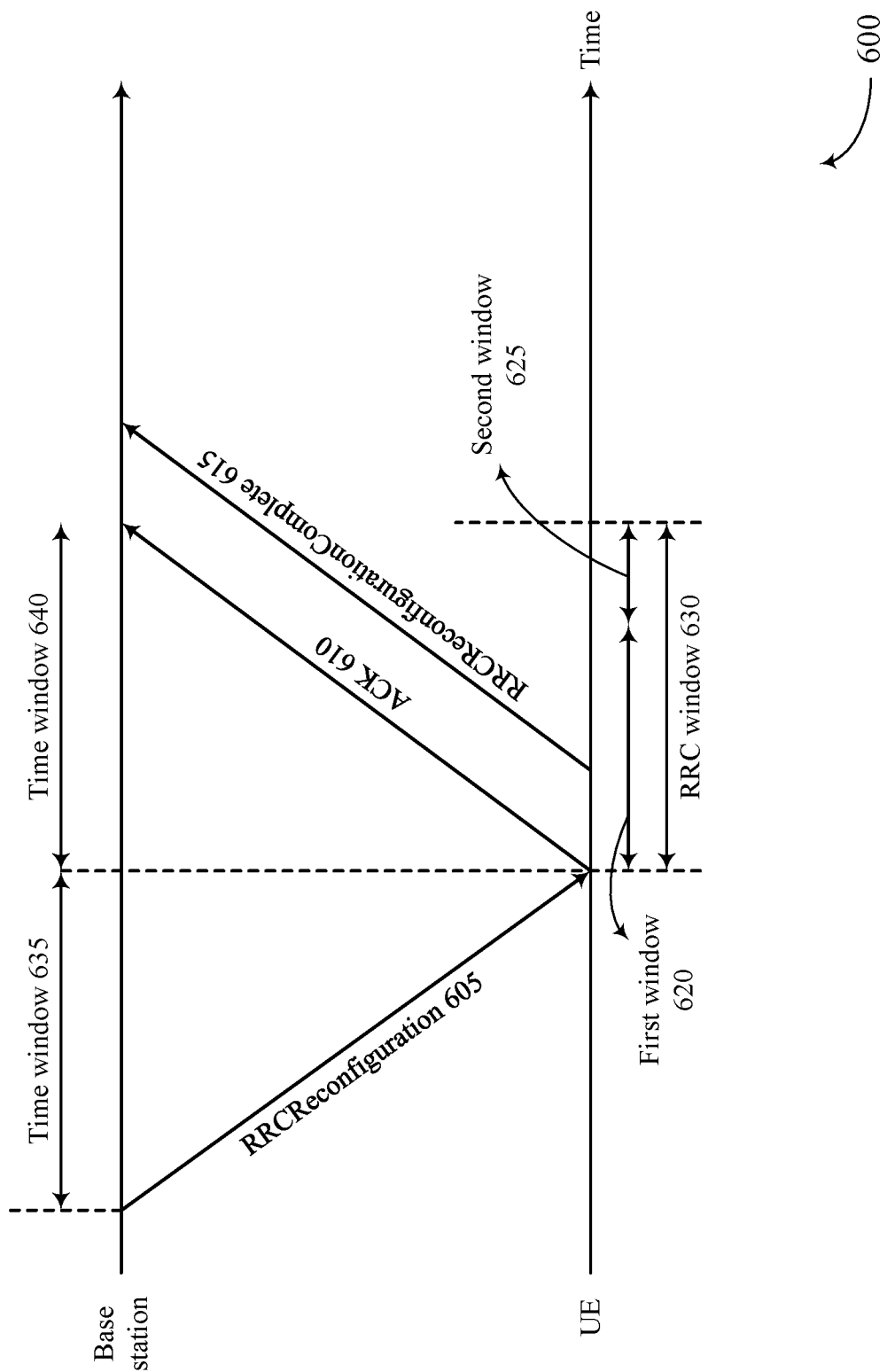
FIG. 6 illustrates an example of a process flow that supports RRC action time in accordance with one or more aspects of the present disclosure.

FIG. 6 illustrates an example of a process flow 600 that supports RRC action time in accordance with one or more aspects of the present disclosure. In FIG. 6, a base station 105 may transmit an RRC reconfiguration message 605 to a UE 115, and, upon receiving the RRC reconfiguration message 605, the UE 115 may transmit an ACK 610 to the base station 105 indicating that the UE 115 successfully received the RRC reconfiguration message 605. In some cases, the UE 115 may also verify that a configuration in the RRC reconfiguration message 605 is valid or compliant (e.g., with the UE 115) and can be applied by the UE 115. The UE 115 may then transmit an RRC reconfiguration complete message 615 to the base station 105 (e.g., in response to the RRC reconfiguration message 605).

After receiving the RRC reconfiguration message 605, the UE 115-a may wait for a first time window 620 and then apply a configuration in the RRC reconfiguration message 605 in a second time window 625. A duration of the first time window 620 may be a function of a one-way propagation delay for transmissions from the UE 115 to the base station 105, an RRC procedure delay, or both. A duration of the second time window 625 may be less than, equal to, or greater than the RRC procedure delay. The RRC procedure delay may correspond to a time configured at the UE 115 for applying the configuration in the RRC reconfiguration message 605. The first time window 620 and the second time window 625 may together make up or be referred to as an RRC window 630. The RRC window 630 may refer to a duration during which the UE 115-a may apply the configuration in the RRC reconfiguration message 605 (e.g., after a delay, in some cases).

In FIG. 6, the RRC window 630 may be based on or equal to a duration of a one-way propagation delay for transmissions from the UE 115 to the base station 105. As a result, the UE 115 may be able to apply the configuration in the RRC reconfiguration message 605 earlier (e.g., earlier than in FIG. 5), which may, in some examples, be beneficial (e.g., for LEO satellites). In some cases, a duration of the first time window 620 may be less than the one-way propagation delay for transmissions from the UE 115 to the base station, and a duration of the second time window 625 may be equal to the remaining RRC procedure delay. Because the UE 115 may delay application of the updated configuration until the second time window 625, the UE 115 may allow time for the base station 105-a to receive the RRC reconfiguration complete message 615 before applying the updated configuration. As a result, in some examples, the UE 115 and the base station 105 may start using the updated configuration at the same time or close to the same time. In some aspects (e.g., not shown in FIG. 6), the first time window 620 may be greater than a one-way propagation delay from the UE 115 to the base station (e.g., equal to an RTT). Accordingly, even though the base station 105 and the UE 115 may start using the updated configuration at times one-way propagation delay apart, when a transmission with the updated configuration from the base station 105 arrives at the UE 115, the UE 115 may be or may be close to being on time to start using the updated configuration.

In some aspects, if a UE 115 operates in a delayed RRC action mode and waits until the second time window 625 to apply the updated configuration, it may be appropriate for the base station 105 to adjust scheduling to facilitate the change in configuration at the UE 115 while maximizing throughput. As such, after transmitting the RRC reconfiguration message 605, the base station 105 may continue using a previous (e.g., old) configuration (e.g., RRC configuration) to communicate with the UE 115 during the time window 635 (e.g., a time window A). Because the UE 115 may wait until the second time window 625 to apply the configuration in the RRC reconfiguration message 605, any communications scheduled by the base station 105 during the time window 635 may be scheduled before the UE 115 applies the configuration in the RRC reconfiguration message 605 (e.g., considering the propagation delay). Thus, there may be no ambiguity around which configuration is to be used for the scheduled communications as both the base station 105 and the UE 115 may use the previous configuration for the scheduled communications.

After the time window 635, the base station 105 may stop scheduling communications with the UE 115 during a time window 640 (e.g., time window B). That is, because the UE 115 may apply the configuration in the RRC reconfiguration message 605 in the second time window 625, there may be ambiguity around which configuration the UE 115 is to use at the end of the second time window 625. As such, the base station 105 may avoid scheduling communications (e.g., before receiving the ACK 610) in the time window 640 (e.g., since these communications may be scheduled during or after the second time window 625 due to a propagation delay).

Figure 7:
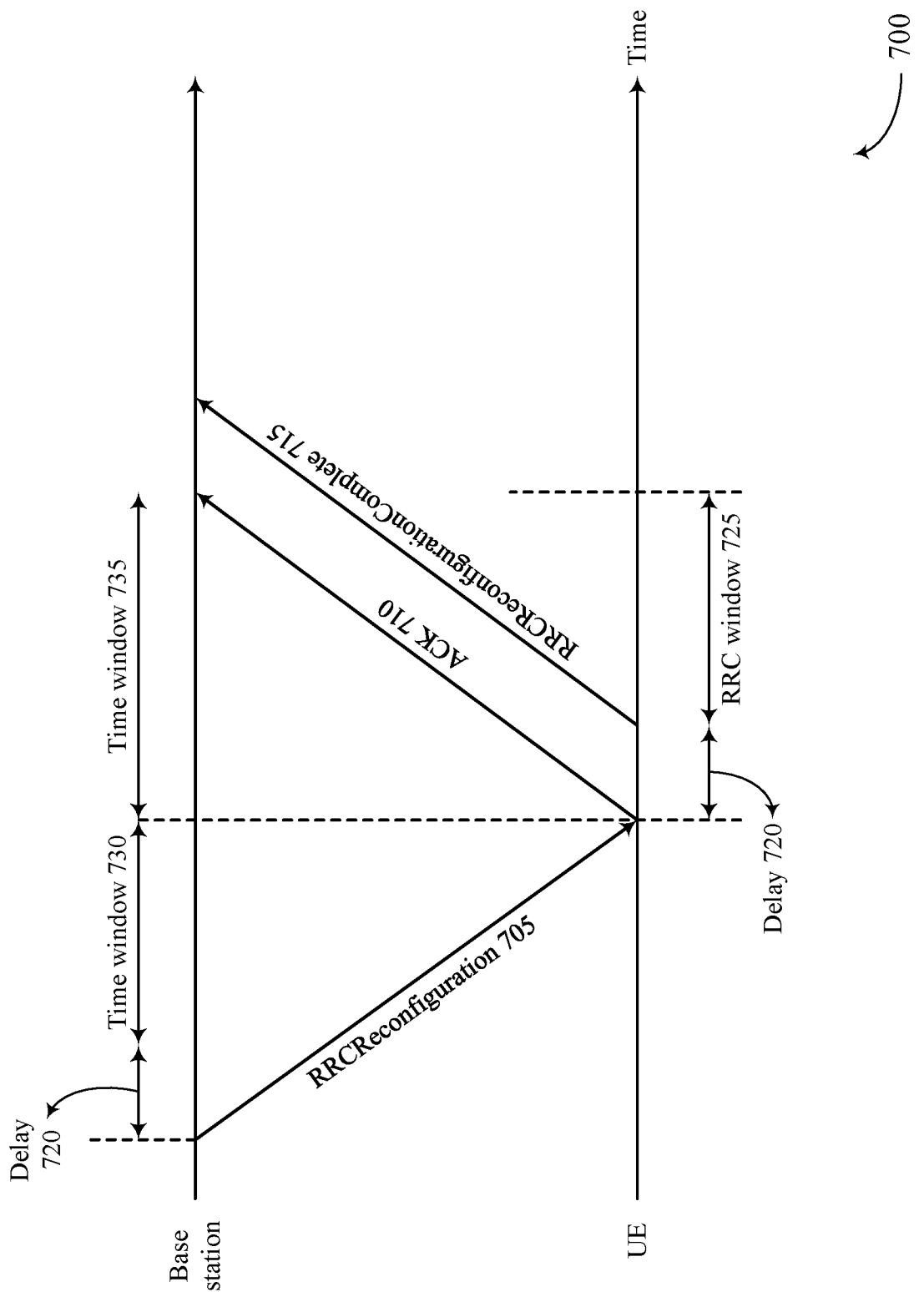
FIG. 7 illustrates an example of a process flow that supports RRC action time in accordance with one or more aspects of the present disclosure.

FIG. 7 illustrates an example of a process flow 700 that supports RRC action time in accordance with one or more aspects of the present disclosure. In FIG. 7, a base station 105 may transmit an RRC reconfiguration message 705 to a UE 115, and, upon receiving the RRC reconfiguration message 705, the UE 115 may transmit an ACK 710 to the base station 105 indicating that the UE 115 successfully received the RRC reconfiguration message 705. In some cases, the UE 115 may also verify that a configuration in the RRC reconfiguration message 705 is valid or compliant (e.g., with the UE 115) and can be applied by the UE 115. The UE 115 may then transmit an RRC reconfiguration complete message 715 to the base station 105 (e.g., in response to the RRC reconfiguration message 705).

After receiving the RRC reconfiguration message 705, the UE 115-a may wait until after transmitting the RRC reconfiguration complete message 715 before applying a configuration in the RRC reconfiguration message 705 in an RRC window 725. The RRC window 725 may refer to a duration during which the UE 115-a may apply the configuration in the RRC reconfiguration message 705. The UE 115-a may process the RRC reconfiguration message 705 and generate the RRC reconfiguration complete message during a duration or delay 720. Then, after transmitting the RRC reconfiguration complete message 715, the UE 115 may apply the configuration in the RRC reconfiguration message 705 in the RRC window 725. As a result, the UE 115 may apply the configuration in the RRC reconfiguration message 705 earlier (e.g., earlier than in FIG. 5 and in FIG. 6), which may, in some examples, be beneficial (e.g., for LEO satellites). Further, because the UE 115 may delay application of the updated configuration until the RRC window 725, the UE 115 may allow time for the base station 105-a to receive the RRC reconfiguration complete message 715 before applying the updated configuration. As a result, in some examples, the UE 115 and the base station 105 may start using the updated configuration at the same time or close to the same time. In some aspects (e.g., not shown in FIG. 7), the delay 720 may be greater than a one-way propagation delay from the UE 115 to the base station 105 (e.g., equal to an RTT). Accordingly, even though the base station 105 and the UE 115 may start using the updated configuration at times one-way propagation delay apart, when a transmission with the updated configuration from the base station 105 arrives at the UE 115, the UE 115 may be or may be close to being on time to start using the updated configuration.

In some aspects, if a UE 115 operates in a delayed RRC action mode and waits until the RRC window 725 to apply the updated configuration, it may be appropriate for the base station 105 to adjust scheduling to facilitate the change in configuration at the UE 115 while maximizing throughput. As such, after transmitting the RRC reconfiguration message 705, the base station 105 may continue using a previous (e.g., old) configuration (e.g., RRC configuration) to communicate with the UE 115 during the delay 720. Because the UE 115 may wait until the RRC window 725 to apply the configuration in the RRC reconfiguration message 705, any communications scheduled by the base station 105 during the delay 720 may be scheduled before the UE 115 applies the configuration in the RRC reconfiguration message 705 (e.g., considering the propagation delay). Thus, there may be no ambiguity around which configuration is to be used for the scheduled communications as both the base station 105 and the UE 115 may use the previous configuration for the scheduled communications.

After the delay 720, the base station 105 may stop scheduling communications with the UE 115 during a time window 730 (e.g., a time window A) and a time window 735 (e.g., a time window B). That is, because the UE 115 may apply the configuration in the RRC reconfiguration message 705 in the RRC window 725, there may be ambiguity around which configuration the UE 115 is to use at the end of the RRC window 725. As such, the base station 105 may avoid scheduling communications (e.g., before receiving the ACK 710) in the time window 730 and the time window 735 (e.g., since these communications may be scheduled during or after the RRC window 725 due to a propagation delay). A duration of the time window 730 may be equal to a one-way propagation delay from the UE 115 to the base station 105, and a duration of the time window 735 may be equal to a one-way propagation delay from the base station 105 to the UE 115. Thus, the time window 730 and the time window 735 may together be equal to a two-way propagation delay between the UE 115 and the base station 105.

Figure 8:
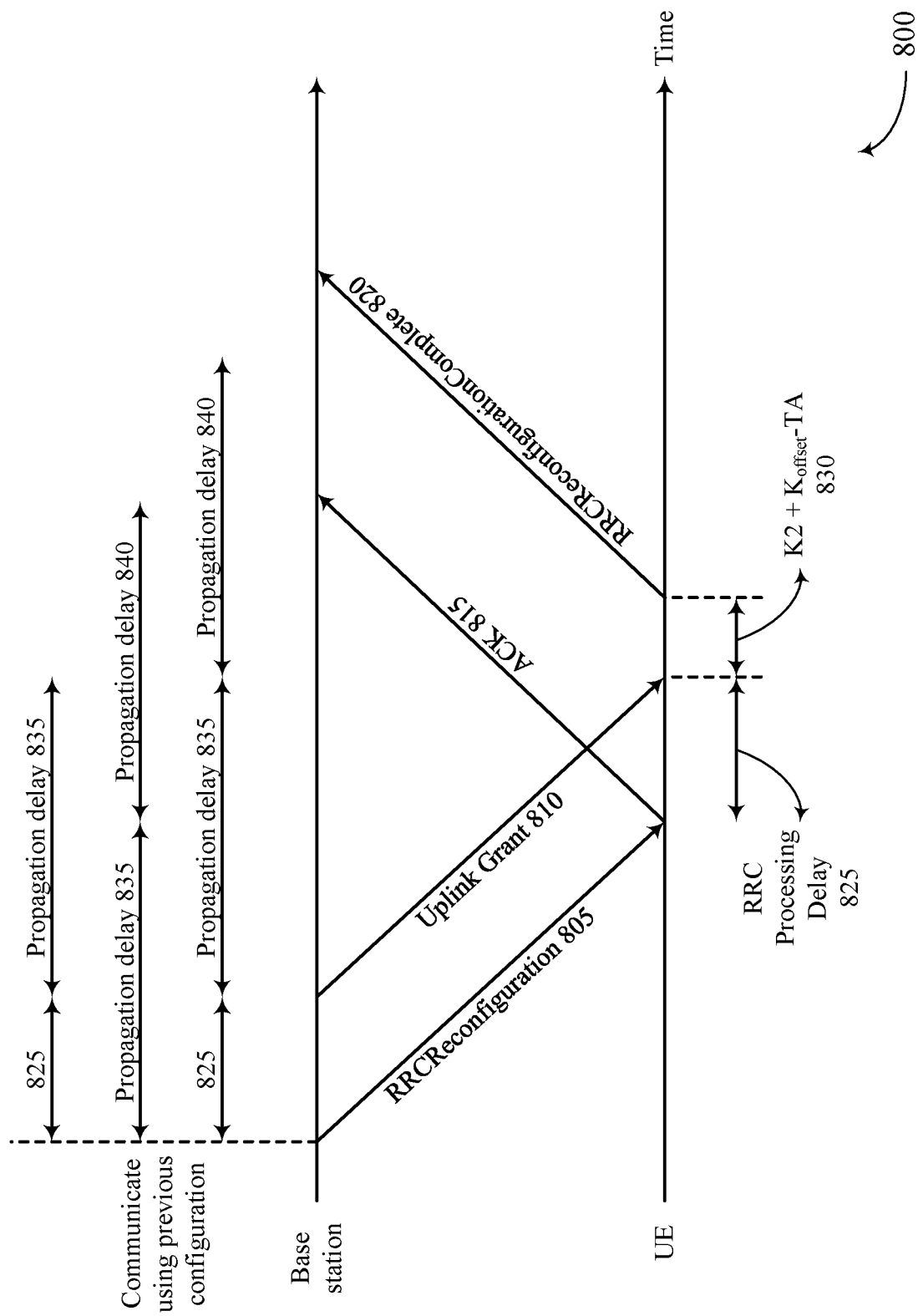
FIG. 8 illustrates an example of a process flow that supports RRC action time in accordance with one or more aspects of the present disclosure.

FIG. 8 illustrates an example of a process flow 800 showing further aspects of an RRC action time in accordance with one or more aspects of the present disclosure. In FIG. 8, a base station 105 may transmit an RRC reconfiguration message 805 to a UE 115, and, upon receiving the RRC reconfiguration message 805, the UE 115 may transmit an ACK 815 to the base station 105 indicating that the UE 115 successfully received the RRC reconfiguration message 805. The base station 105 may then transmit an uplink grant 810 to the UE 115 granting resources for the UE 115 to transmit an RRC reconfiguration complete message 820. The UE 115 may apply a configuration in the RRC reconfiguration message 805 after receiving the RRC reconfiguration message 805. In any case, the UE 115 may process the RRC reconfiguration message 805 during an RRC processing delay 825, and, after an offset 830, the UE 115 may transmit the RRC reconfiguration complete message 820 to the base station 105 (e.g., in response to the RRC reconfiguration complete message 820). In some cases, the RRC processing delay 825 may correspond to an RRC procedure delay (e.g., 10 ms), and, when the UE 115 receives the RRC reconfiguration message 805, the UE 115 may expect the base station 105 to schedule the uplink transmission (e.g., transmit the uplink grant 810) after the RRC processing delay 825.

In one aspect, the UE 115 may apply the configuration in the RRC reconfiguration message 805 after a duration at the UE 115 for processing the RRC reconfiguration message (e.g., RRC processing delay 825) plus a one-way propagation delay for transmissions from the UE 115 to the base station 105 (e.g., a propagation delay 840). In another aspect, the UE 115 may apply the configuration in the RRC reconfiguration message 805 after a one-way propagation delay for transmissions from the base station 105 to the UE 115 (e.g., a propagation delay 835) plus a maximum of a duration at the UE 115 for processing the RRC reconfiguration message 805 (e.g., RRC processing delay 825) and a one-way propagation delay for transmissions from the UE to the base station (e.g., a propagation delay 840). In yet another aspect, the UE 115 may apply the configuration in the RRC reconfiguration message 805 after a duration at the UE 115 for processing the RRC reconfiguration message (e.g., RRC processing delay 825) plus a one-way propagation delay for transmissions from the base station 105 to the UE 115 (e.g., a propagation delay 835) plus a one-way propagation delay for transmissions from the UE 115 to the base station 105 (e.g., a propagation delay 840).

In any case, the UE 115 may communicate with the base station 105 using a previous configuration until the configuration in the RRC reconfiguration message 805 is applied. The base station 105 may also communicate with the UE 115 using the previous configuration for a duration after transmitting the RRC reconfiguration message 805. In one aspect, the base station 105 may communicate with the UE 115 using the previous configuration for a duration at the UE 115 for processing the RRC reconfiguration message (e.g., RRC processing delay 825) plus a one-way propagation delay for transmissions from the UE 115 to the base station 105 (e.g., a propagation delay 840). In another aspect, the base station 105 may communicate with the UE 115 using the previous configuration for a one-way propagation delay for transmissions from the base station 105 to the UE 115 (e.g., a propagation delay 835) plus a maximum of a duration at the UE 115 for processing the RRC reconfiguration message 805 (e.g., RRC processing delay 825) and a one-way propagation delay for transmissions from the UE to the base station (e.g., a propagation delay 840). In yet another aspect, the base station 105 may communicate with the UE 115 using the previous configuration for a duration at the UE 115 for processing the RRC reconfiguration message (e.g., RRC processing delay 825) plus a one-way propagation delay for transmissions from the base station 105 to the UE 115 (e.g., a propagation delay 835) plus a one-way propagation delay for transmissions from the UE 115 to the base station 105 (e.g., a propagation delay 840).

In some cases, when the UE 115 uses a previous (e.g., old) configuration to transmit the RRC reconfiguration complete message 820, the UE 115 may first check or verify that the UE 115 can comply with a configuration in the RRC reconfiguration message 805 (e.g., or if there is an error in the configuration). If the UE 115 is unable to apply the configuration in the RRC reconfiguration message 805, the UE 115 may transmit a flag in the RRC reconfiguration complete message 820 indicating that the UE 115 is unable to apply the configuration in the RRC reconfiguration message 805. If the flag is absent in the RRC reconfiguration complete message 820, then the absence of the flag is an indication that the UE 115 may apply the configuration in the RRC reconfiguration message 805 (e.g., after a time window B or a time window D). Alternatively, in some cases, the flag may be included in the RRC reconfiguration complete message 820. In such cases, the UE 115 may set the flag to indicate that the UE 115 is unable to apply the configuration, and the UE 115 may unset the flag to indicate that the UE 115 may apply the configuration. The base station 105 may continue scheduling uplink or downlink transmissions to or from the UE with a previous (e.g., old) configuration until an end of a time window for applying the previous configuration.

The UE 115 may support one or more techniques for verifying that the UE 115 can comply with a configuration in the RRC reconfiguration message 805. In one aspect, the UE 115 may apply the configuration in the RRC reconfiguration message 805 to check if the UE 115 can comply with the configuration. The UE 115 may then revert to a previous configuration until the UE 115 applies the configuration in the RRC reconfiguration message 805 again (e.g., after a time window B or a time window D). In another aspect, the UE 115 may generate a new protocol stack with the configuration in the RRC reconfiguration message 805 (e.g., new configuration) using a same physical (PHY) or MAC layer stack (e.g., as a previous configuration) to check if the UE 115 can comply with the configuration. The UE 115 may then delete a previous (e.g., old) protocol stack and use the protocol stack generated using the configuration in the RRC reconfiguration message 805 (e.g., after a time window B or time window D). Additionally, or alternatively, in the case of a handover, the UE 115 may transmit the RRC reconfiguration complete message 820 to a base station 105 using a previous (e.g., old) configuration. Thus, until the configuration in the RRC reconfiguration message 805 (e.g., new target configuration) is applied, the UE 115 may not be disconnected from a source base station 105.

Figure 9:
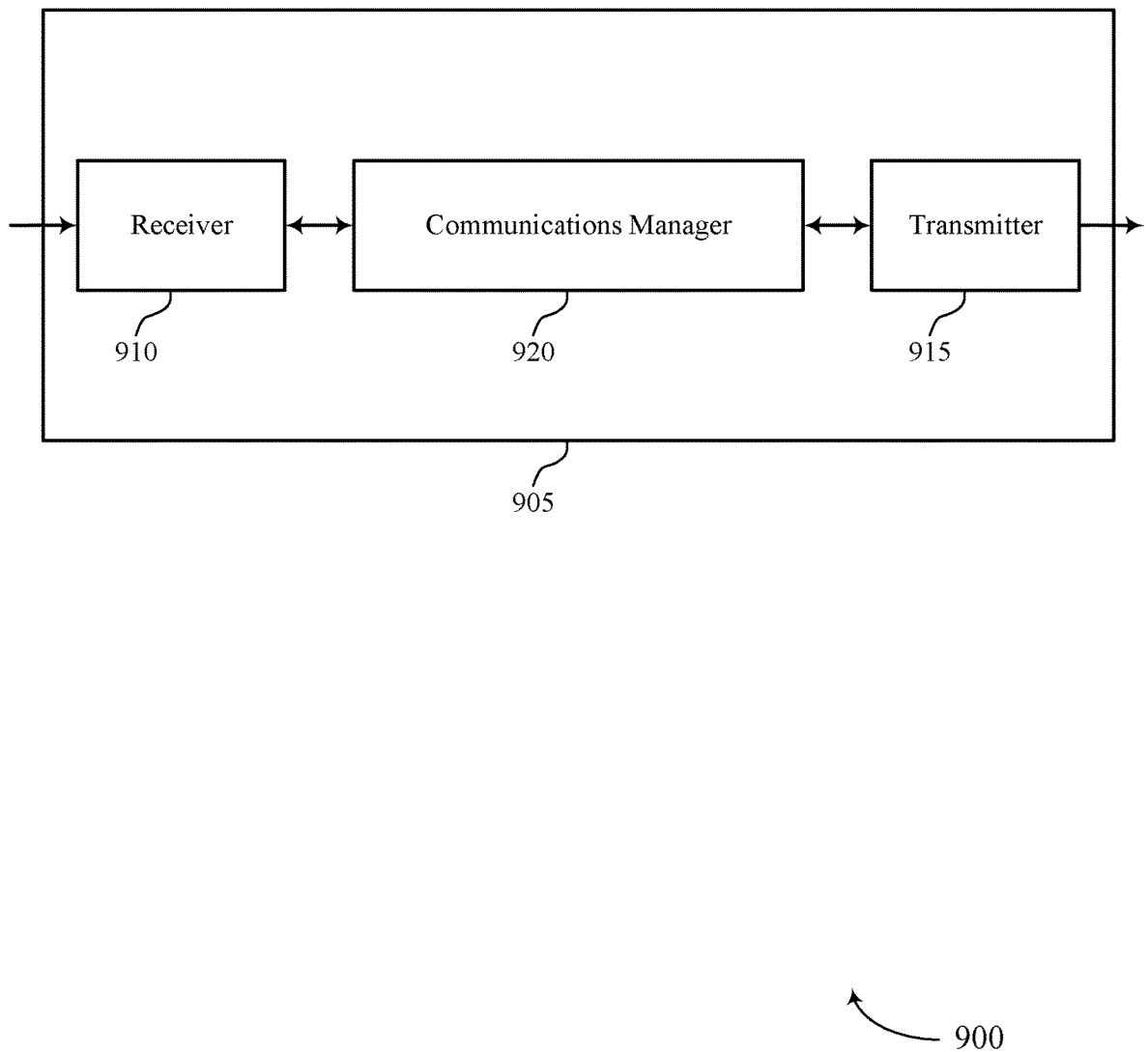
FIGS. 9 and 10 show block diagrams of devices that support RRC action time in accordance with one or more aspects of the present disclosure.

FIG. 9 shows a block diagram 900 of a device 905 that supports RRC action time in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to RRC action time). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to RRC action time). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of RRC action time as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving, from a base station, a radio resource control reconfiguration message including an indication of a configuration for communicating with the base station. The communications manager 920 may be configured as or otherwise support a means for transmitting, to the base station, a radio resource control reconfiguration complete message. The communications manager 920 may be configured as or otherwise support a means for applying the configuration in the radio resource control reconfiguration message after transmitting the radio resource control reconfiguration complete message. The communications manager 920 may be configured as or otherwise support a means for communicating with the base station using the applied configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption and more efficient utilization of communication resources. In particular, using the techniques described herein, a UE and a base station may be able to synchronize timing for applying an RRC configuration. As a result, there may be no or less ambiguity between the UE and the base station on when the RRC configuration is applied by the UE, and the UE and the base station may avoid communicating using different configurations or avoid suppressing communications due to ambiguity resulting in less wasted power and resources.

Figure 10:
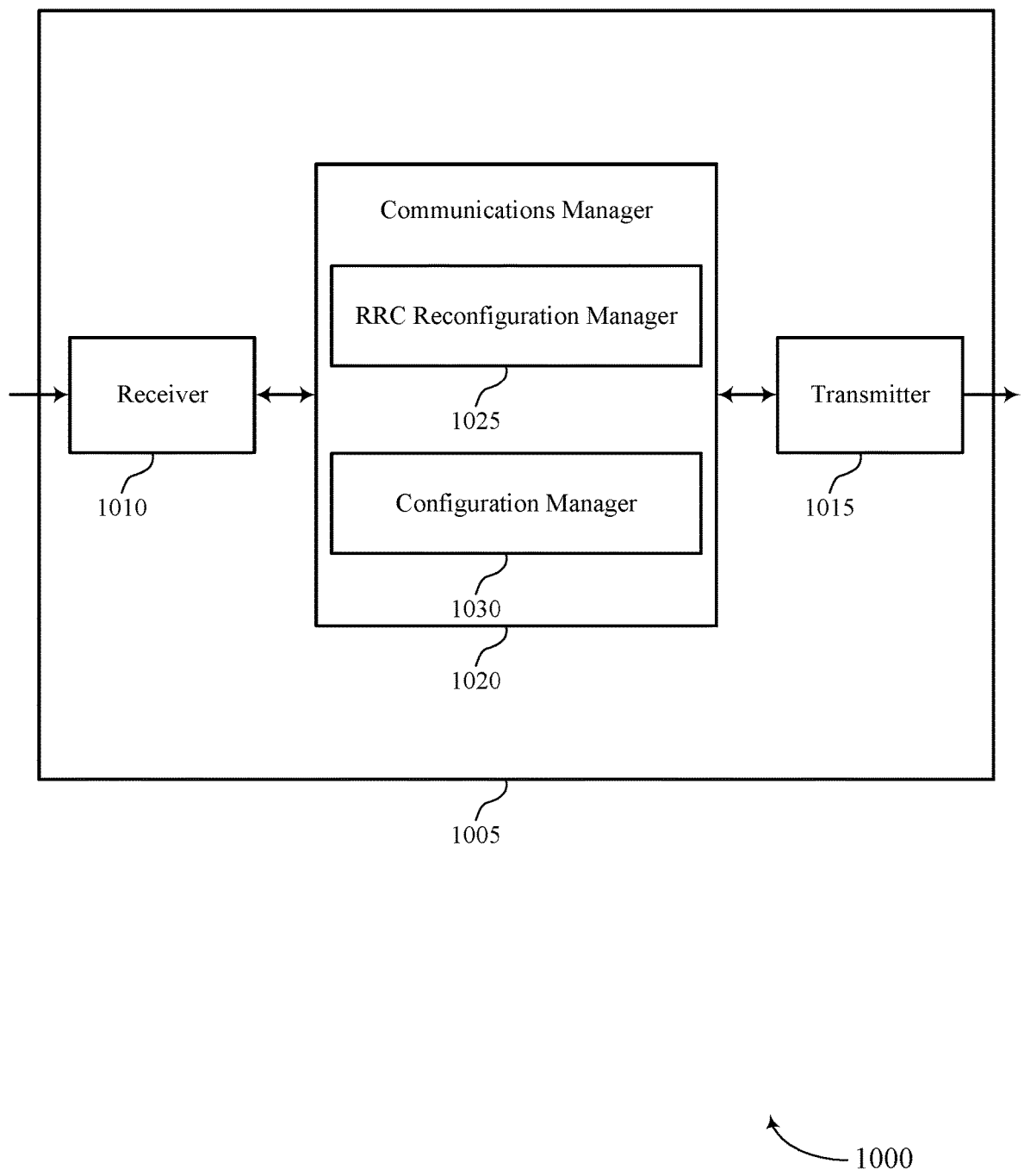

FIG. 10 shows a block diagram 1000 of a device 1005 that supports RRC action time in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to RRC action time). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to RRC action time). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of RRC action time as described herein. For example, the communications manager 1020 may include an RRC reconfiguration manager 1025 a configuration manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The RRC reconfiguration manager 1025 may be configured as or otherwise support a means for receiving, from a base station, a radio resource control reconfiguration message including an indication of a configuration for communicating with the base station. The RRC reconfiguration manager 1025 may be configured as or otherwise support a means for transmitting, to the base station, a radio resource control reconfiguration complete message. The configuration manager 1030 may be configured as or otherwise support a means for applying the configuration in the radio resource control reconfiguration message after transmitting the radio resource control reconfiguration complete message. The configuration manager 1030 may be configured as or otherwise support a means for communicating with the base station using the applied configuration.

Figure 11:
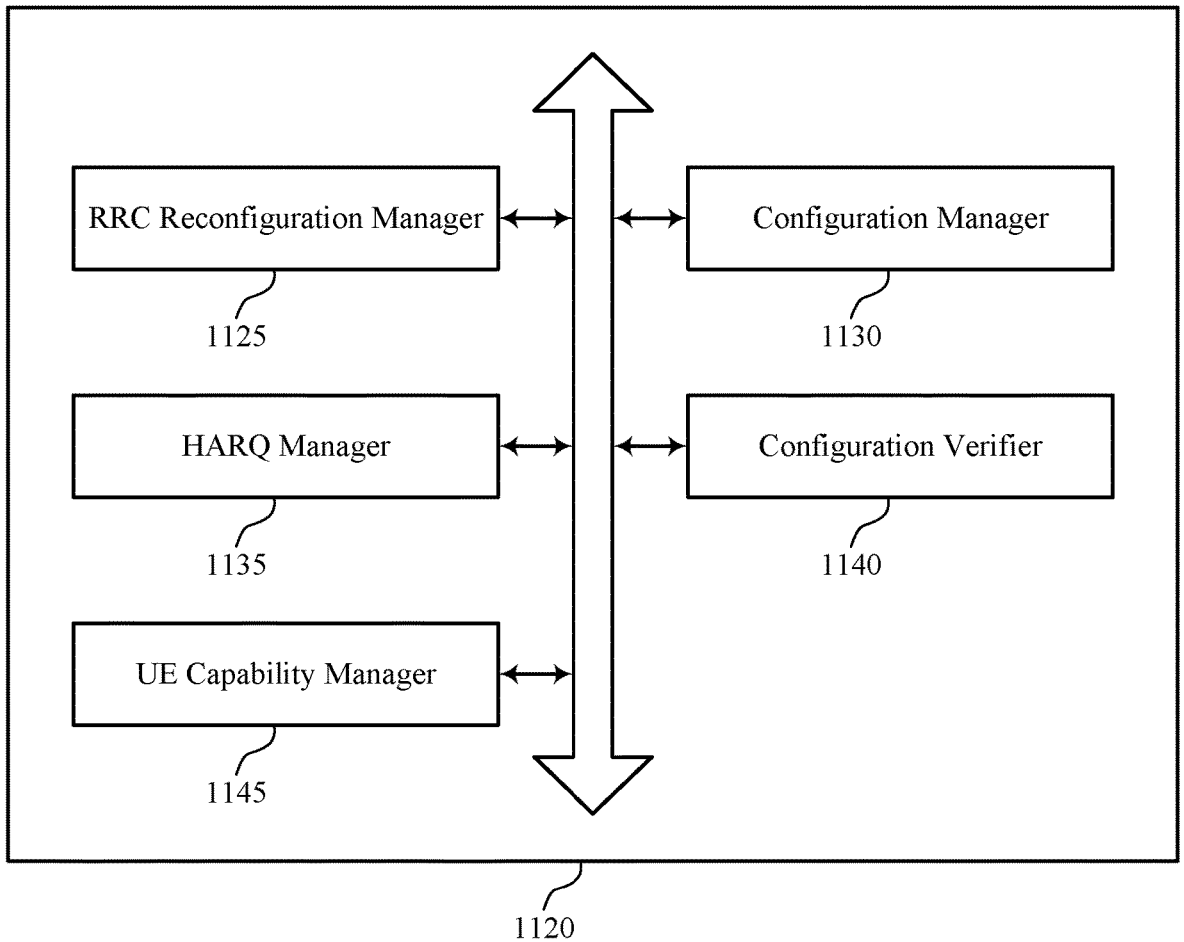
FIG. 11 shows a block diagram of a communications manager that supports RRC action time in accordance with one or more aspects of the present disclosure.

FIG. 11 shows a block diagram 1100 of a communications manager 1120 that supports RRC action time in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of RRC action time as described herein. For example, the communications manager 1120 may include an RRC reconfiguration manager 1125, a configuration manager 1130, an HARQ manager 1135, a configuration verifier 1140, a UE capability manager 1145, or any combination thereof. Each of these components may communicate, directly or indirectly, with one another (e.g., via one or more buses).

The communications manager 1120 may support wireless communication at a UE in accordance with examples as disclosed herein. The RRC reconfiguration manager 1125 may be configured as or otherwise support a means for receiving, from a base station, a radio resource control reconfiguration message including an indication of a configuration for communicating with the base station. In some examples, the RRC reconfiguration manager 1125 may be configured as or otherwise support a means for transmitting, to the base station, a radio resource control reconfiguration complete message. The configuration manager 1130 may be configured as or otherwise support a means for applying the configuration in the radio resource control reconfiguration message after transmitting the radio resource control reconfiguration complete message. In some examples, the configuration manager 1130 may be configured as or otherwise support a means for communicating with the base station using the applied configuration.

In some examples, to support applying the configuration, the configuration manager 1130 may be configured as or otherwise support a means for waiting for a first time window to expire before applying the configuration. In some examples, to support applying the configuration, the configuration manager 1130 may be configured as or otherwise support a means for applying the configuration in a second time window following the first time window, where the first time window and the second time window include a radio resource control window.

In some examples, a duration of the radio resource control window is based on a one-way propagation delay for transmissions from the UE to the base station plus a remaining radio resource control procedure delay.

In some examples, the configuration verifier 1140 may be configured as or otherwise support a means for verifying that the configuration in the radio resource control reconfiguration message is compliant, where the remaining radio resource control procedure delay is equal to a radio resource control procedure delay minus a duration for verifying that the configuration is compliant.

In some examples, a duration of the radio resource control window is based on a one-way propagation delay for transmissions from the UE to the base station.

In some examples, a duration of the second time window is equal to a remaining radio resource control procedure delay.

In some examples, to support applying the configuration, the configuration manager 1130 may be configured as or otherwise support a means for generating a first protocol stack using the configuration in the radio resource control reconfiguration message for communicating with the base station, where the first protocol stack replaces a second protocol stack generated using a previous configuration for communicating with the base station.

In some examples, the HARQ manager 1135 may be configured as or otherwise support a means for transmitting, to the base station upon receiving the radio resource control reconfiguration message, an acknowledgment indicating that the radio resource control reconfiguration message is successfully received by the UE.

In some examples, the configuration manager 1130 may be configured as or otherwise support a means for receiving, from the base station, an indication to apply the configuration in the radio resource control reconfiguration message after transmitting the radio resource control reconfiguration complete message.

In some examples, the UE capability manager 1145 may be configured as or otherwise support a means for transmitting, to the base station, an indication of a capability of the UE, where receiving the indication to apply the configuration after transmitting the radio resource control reconfiguration complete message is based on the capability of the UE.

In some examples, the configuration manager 1130 may be configured as or otherwise support a means for transmitting a request for the indication to apply the configuration after transmitting the radio resource control reconfiguration complete message based on at least one quality of service requirement at the UE.

In some examples, the configuration manager 1130 may be configured as or otherwise support a means for communicating with the base station using a previous configuration until the UE starts to apply the configuration in the radio resource control reconfiguration message.

In some examples, to support applying the configuration, the configuration manager 1130 may be configured as or otherwise support a means for applying the configuration in the radio resource control reconfiguration message after a duration at the UE for processing the radio resource control reconfiguration message plus a one-way propagation delay for transmissions from the UE to the base station.

In some examples, to support applying the configuration, the configuration manager 1130 may be configured as or otherwise support a means for applying the configuration in the radio resource control reconfiguration message after a one-way propagation delay for transmissions from the base station to the UE plus a maximum of a duration at the UE for processing the radio resource control reconfiguration message and a one-way propagation delay for transmissions from the UE to the base station.

In some examples, to support applying the configuration, the configuration manager 1130 may be configured as or otherwise support a means for applying the configuration in the radio resource control reconfiguration message after a duration at the UE for processing the radio resource control reconfiguration message plus a one-way propagation delay for transmissions from the base station to the UE plus a one-way propagation delay for transmissions from the UE to the base station.

In some examples, the configuration verifier 1140 may be configured as or otherwise support a means for verifying that the configuration in the radio resource control reconfiguration message is compliant. In some examples, the configuration verifier 1140 may be configured as or otherwise support a means for transmitting, in the radio resource control reconfiguration complete message, a flag indicating that the UE is to apply the configuration in the radio resource control reconfiguration message.

In some examples, to support verifying that the configuration is compliant, the configuration manager 1130 may be configured as or otherwise support a means for applying the configuration in the radio resource control reconfiguration message, the method further including. In some examples, to support verifying that the configuration is compliant, the configuration manager 1130 may be configured as or otherwise support a means for reverting to a previous configuration after verifying that the configuration is compliant.

In some examples, to support verifying that the configuration is compliant, the configuration manager 1130 may be configured as or otherwise support a means for generating a first protocol stack using the configuration in the radio resource control reconfiguration message for communicating with the base station, where the first protocol stack replaces a second protocol stack generated using a previous configuration for communicating with the base station.

In some examples, the configuration manager 1130 may be configured as or otherwise support a means for communicating with the base station using the second protocol stack until a time that the configuration in the radio resource control reconfiguration message is applied. In some examples, the configuration manager 1130 may be configured as or otherwise support a means for deleting the second protocol stack. In some examples, the configuration manager 1130 may be configured as or otherwise support a means for communicating with the base station using the first protocol stack after the time that the configuration in the radio resource control reconfiguration message is applied.

In some examples, the UE and the base station may be operating in an NTN.

Figure 12:
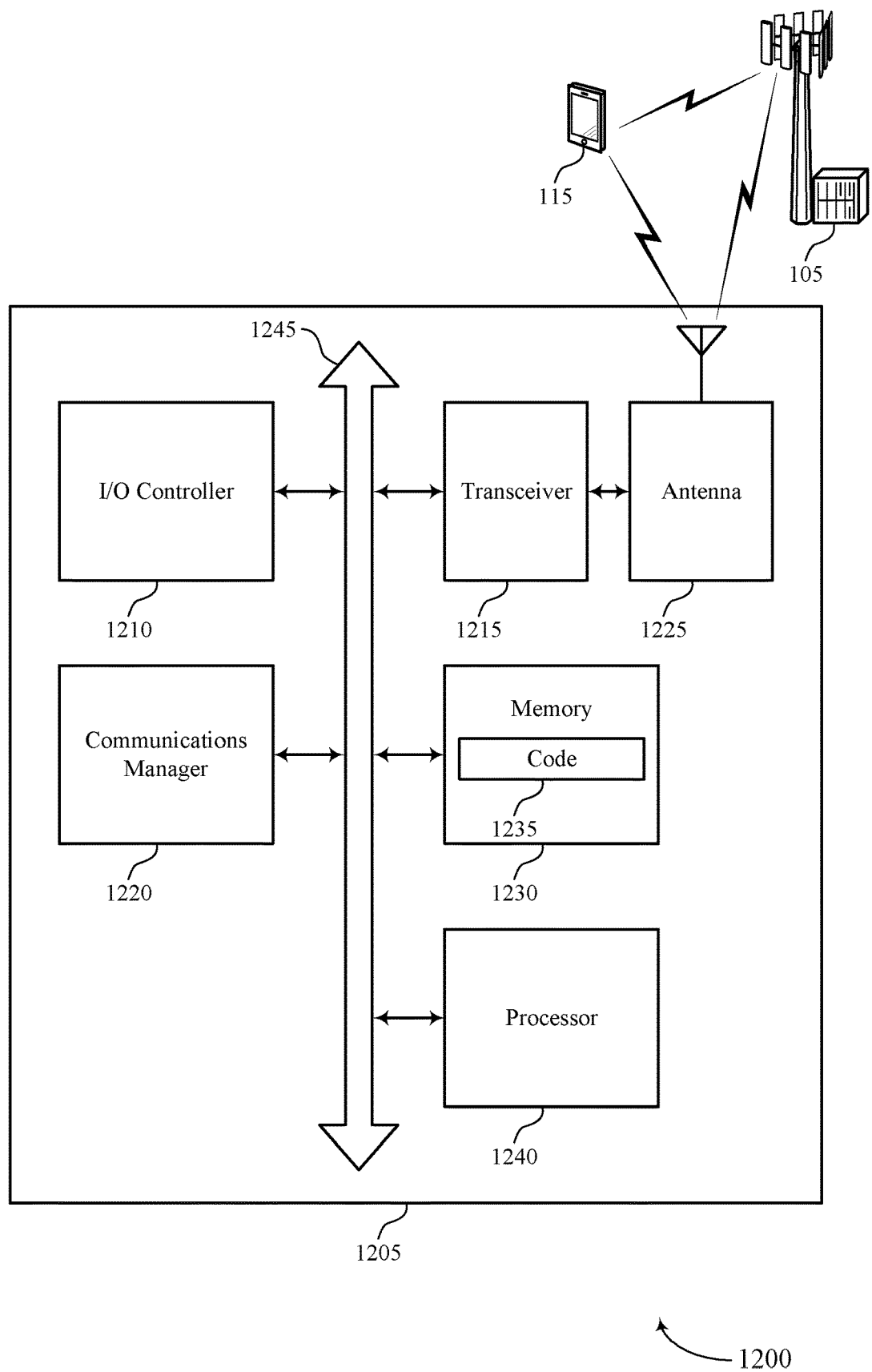
FIG. 12 shows a diagram of a system including a device that supports RRC action time in accordance with one or more aspects of the present disclosure.

FIG. 12 shows a diagram of a system 1200 including a device 1205 that supports RRC action time in accordance with one or more aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting RRC action time). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving, from a base station, a radio resource control reconfiguration message including an indication of a configuration for communicating with the base station. The communications manager 1220 may be configured as or otherwise support a means for transmitting, to the base station, a radio resource control reconfiguration complete message. The communications manager 1220 may be configured as or otherwise support a means for applying the configuration in the radio resource control reconfiguration message after transmitting the radio resource control reconfiguration complete message. The communications manager 1220 may be configured as or otherwise support a means for communicating with the base station using the applied configuration.

By including or configuring the communications manager 1220 in accordance with examples as described herein, the device 1205 may support techniques for reduced power consumption and more efficient utilization of communication resources. In particular, using the techniques described herein, a UE and a base station may be able to synchronize timing for applying an RRC configuration. As a result, there may be no or less ambiguity between the UE and the base station on when the RRC configuration is applied by the UE, and the UE and the base station may avoid communicating using different configurations or avoid suppressing communications due to ambiguity resulting in less wasted power and resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of RRC action time as described herein, or the processor 1240 and the memory 1230 may be otherwise configured to perform or support such operations.

Figure 13:
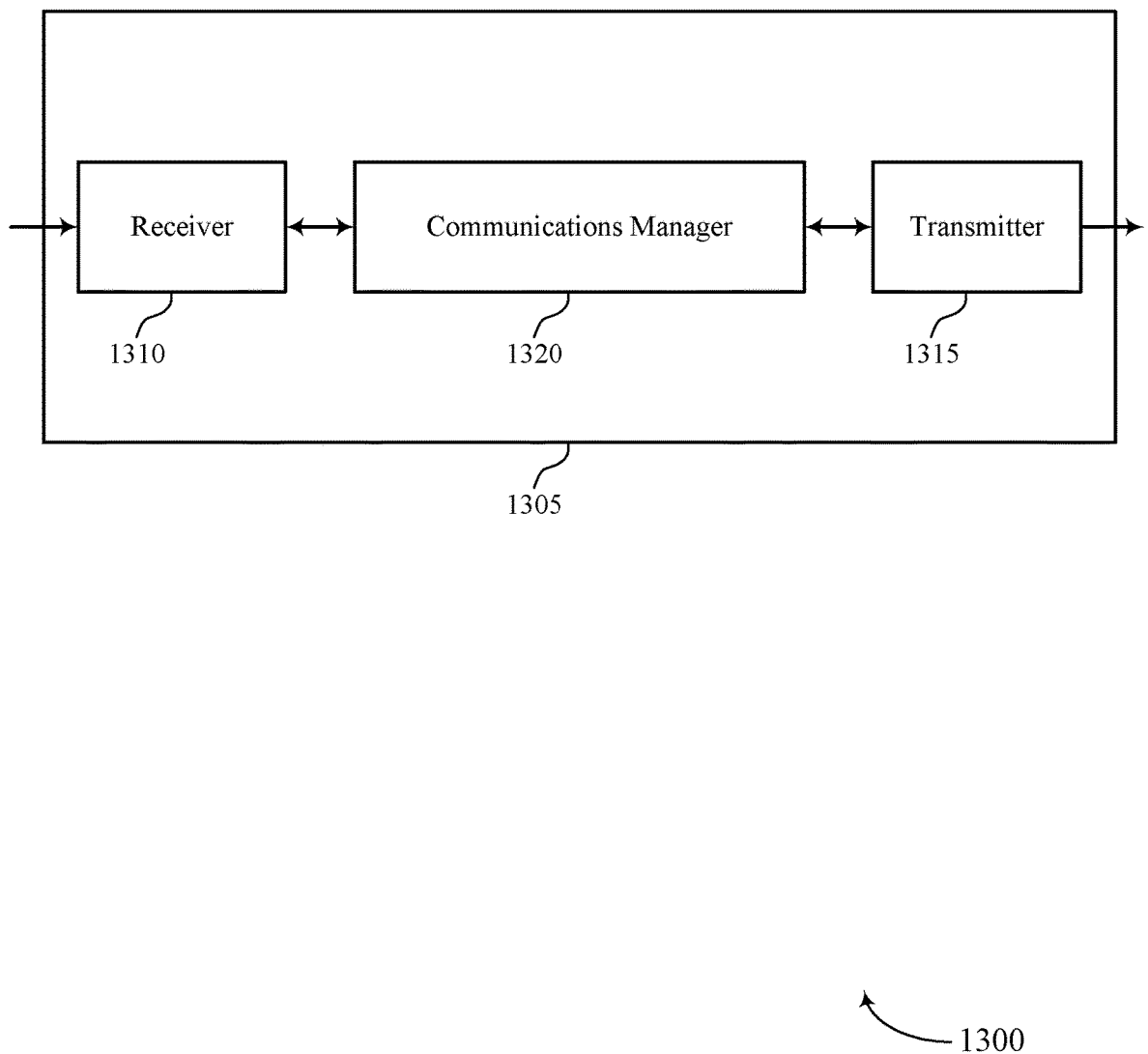
FIGS. 13 and 14 show block diagrams of devices that support RRC action time in accordance with one or more aspects of the present disclosure.

FIG. 13 shows a block diagram 1300 of a device 1305 that supports RRC action time in accordance with one or more aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to RRC action time). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to RRC action time). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of RRC action time as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. For example, the communications manager 1320 may be configured as or otherwise support a means for transmitting, to a UE, an indication to apply a configuration in a radio resource control reconfiguration message after the UE transmits a radio resource control reconfiguration complete message. The communications manager 1320 may be configured as or otherwise support a means for transmitting, to the UE, the radio resource control reconfiguration message including the configuration for communicating with the UE. The communications manager 1320 may be configured as or otherwise support a means for receiving, from the UE, the radio resource control reconfiguration complete message. The communications manager 1320 may be configured as or otherwise support a means for communicating with the UE using the configuration in the radio resource control reconfiguration message based on receiving the radio resource control reconfiguration complete message.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for reduced power consumption and more efficient utilization of communication resources. In particular, using the techniques described herein, a UE and a base station may be able to synchronize timing for applying an RRC configuration. As a result, there may be no or less ambiguity between the UE and the base station on when the RRC configuration is applied by the UE, and the UE and the base station may avoid communicating using different configurations or avoid suppressing communications due to ambiguity resulting in less wasted power and resources.

Figure 14:
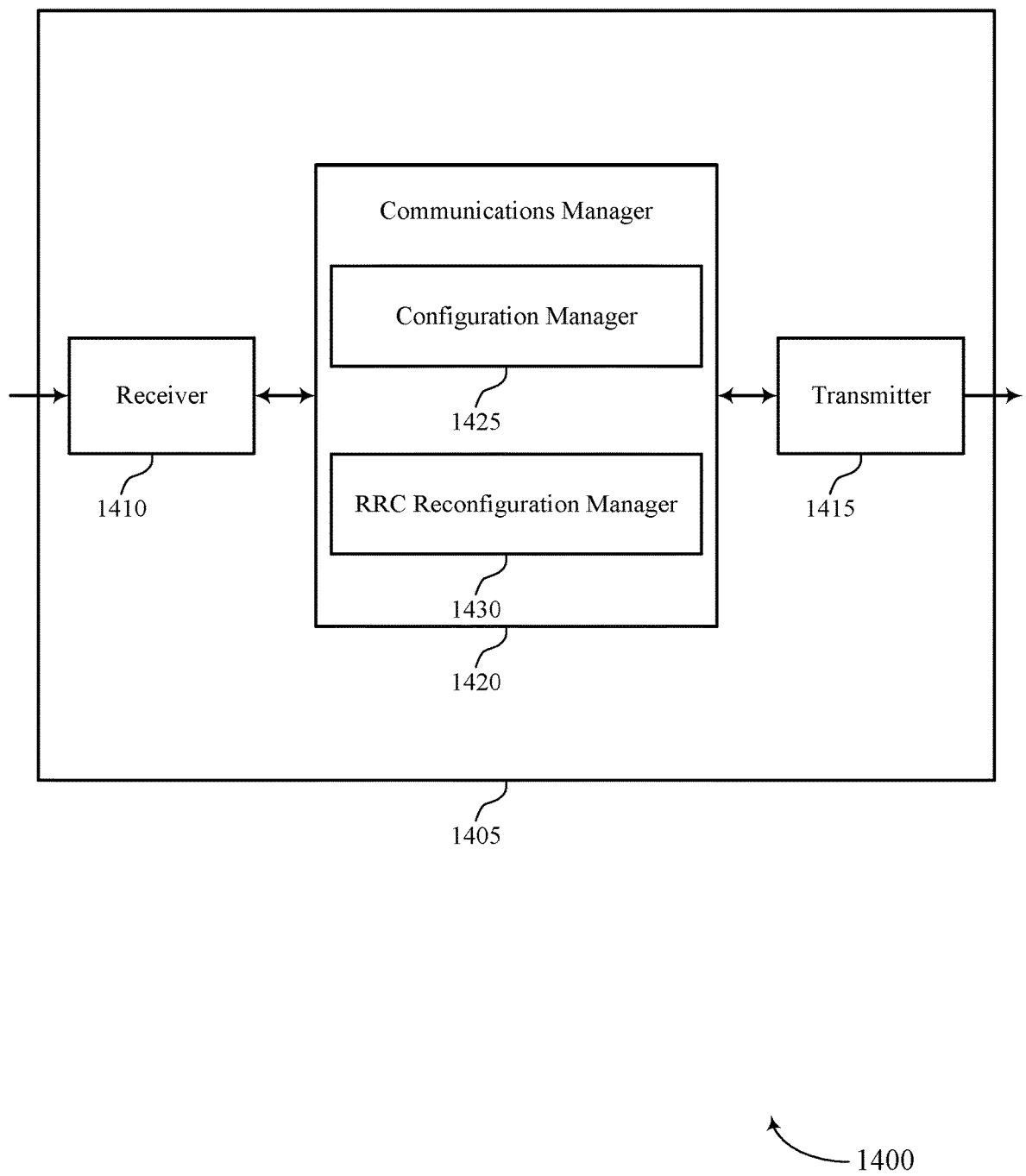

FIG. 14 shows a block diagram 1400 of a device 1405 that supports RRC action time in accordance with one or more aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to RRC action time). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to RRC action time). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of RRC action time as described herein. For example, the communications manager 1420 may include a configuration manager 1425 an RRC reconfiguration manager 1430, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. The configuration manager 1425 may be configured as or otherwise support a means for transmitting, to a UE, an indication to apply a configuration in a radio resource control reconfiguration message after the UE transmits a radio resource control reconfiguration complete message. The RRC reconfiguration manager 1430 may be configured as or otherwise support a means for transmitting, to the UE, the radio resource control reconfiguration message including the configuration for communicating with the UE. The RRC reconfiguration manager 1430 may be configured as or otherwise support a means for receiving, from the UE, the radio resource control reconfiguration complete message. The configuration manager 1425 may be configured as or otherwise support a means for communicating with the UE using the configuration in the radio resource control reconfiguration message based on receiving the radio resource control reconfiguration complete message.

Figure 15:
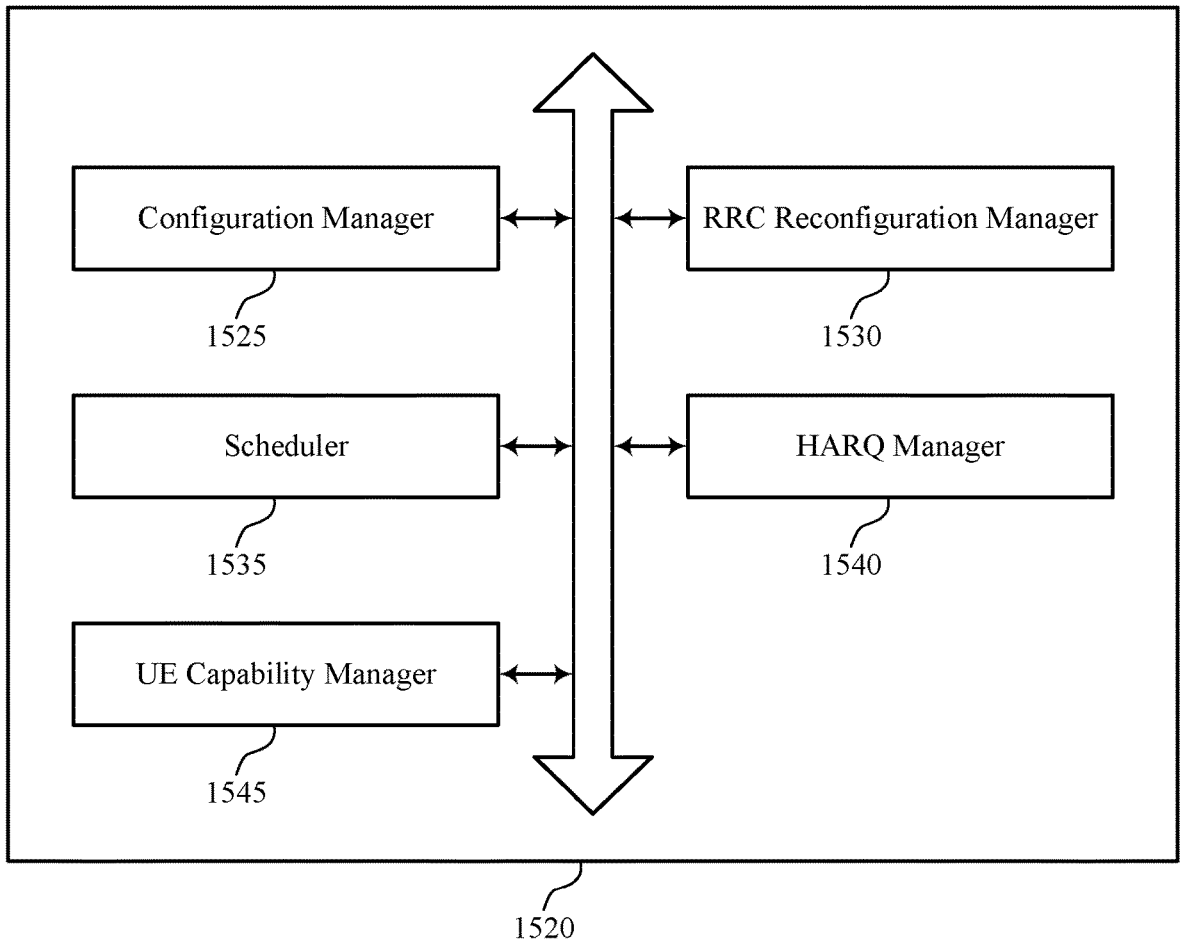
FIG. 15 shows a block diagram of a communications manager that supports RRC action time in accordance with one or more aspects of the present disclosure.

FIG. 15 shows a block diagram 1500 of a communications manager 1520 that supports RRC action time in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of RRC action time as described herein. For example, the communications manager 1520 may include a configuration manager 1525, an RRC reconfiguration manager 1530, a scheduler 1535, an HARQ manager 1540, a UE capability manager 1545, or any combination thereof. Each of these components may communicate, directly or indirectly, with one another (e.g., via one or more buses).

The communications manager 1520 may support wireless communication at a base station in accordance with examples as disclosed herein. The configuration manager 1525 may be configured as or otherwise support a means for transmitting, to a UE, an indication to apply a configuration in a radio resource control reconfiguration message after the UE transmits a radio resource control reconfiguration complete message. The RRC reconfiguration manager 1530 may be configured as or otherwise support a means for transmitting, to the UE, the radio resource control reconfiguration message including the configuration for communicating with the UE. In some examples, the RRC reconfiguration manager 1530 may be configured as or otherwise support a means for receiving, from the UE, the radio resource control reconfiguration complete message. In some examples, the configuration manager 1525 may be configured as or otherwise support a means for communicating with the UE using the configuration in the radio resource control reconfiguration message based on receiving the radio resource control reconfiguration complete message.

In some examples, the scheduler 1535 may be configured as or otherwise support a means for scheduling communications with the UE using a previous configuration in a first time window after transmitting the radio resource control reconfiguration message. In some examples, the scheduler 1535 may be configured as or otherwise support a means for avoiding scheduling communications with the UE in a second time window following the first time window.

In some examples, a duration of the first time window is based on a one-way propagation delay for transmissions from the base station to the UE plus a remaining radio resource control procedure delay, and a duration of the second time window is based on a one-way propagation delay for transmissions between the UE to the base station minus the remaining radio resource control procedure delay.

In some examples, the remaining radio resource control procedure delay is equal to a radio resource control procedure delay minus a duration at the UE for verifying that the configuration is compliant.

In some examples, a duration of the first time window is based on a one-way propagation delay for transmissions from the base station to the UE, and a duration of the second time window is based on the one-way propagation delay for transmissions from the UE to the base station.

In some examples, a duration of the first time window is based on a duration at the UE for generating the radio resource control reconfiguration complete message, and a duration of the second time window is based on a one-way propagation delay for transmissions from the base station to the UE plus a one-way propagation delay for transmissions from the UE to the base station.

In some examples, the configuration manager 1525 may be configured as or otherwise support a means for communicating with UE using a previous configuration for a duration after transmitting the radio resource control reconfiguration message.

In some examples, the duration in which to communicate with the UE using the previous configuration includes a duration at the UE for processing the radio resource control reconfiguration message plus a one-way propagation delay for transmissions from the UE to the base station.

In some examples, the duration in which to communicate with the UE using the previous configuration includes a one-way propagation delay for transmissions from the base station to the UE plus a maximum of a duration at the UE for processing the radio resource control reconfiguration message and a one-way propagation delay for transmissions from the UE to the base station.

In some examples, the duration in which to communicate with the UE using the previous configuration includes a duration at the UE for processing the radio resource control reconfiguration message plus a one-way propagation delay for transmissions from the base station to the UE plus a one-way propagation delay for transmissions from the UE to the base station.

In some examples, the HARQ manager 1540 may be configured as or otherwise support a means for receiving, from the UE, an acknowledgment indicating that the radio resource control reconfiguration message is successfully received by the UE.

In some examples, the UE capability manager 1545 may be configured as or otherwise support a means for receiving, from the UE, an indication of a capability of the UE, where transmitting the indication to apply the configuration after the UE transmits the radio resource control reconfiguration complete message is based on the capability of the UE.

In some examples, the configuration manager 1525 may be configured as or otherwise support a means for receiving, from the UE, a request for the indication to apply the configuration after the UE transmits the radio resource control reconfiguration complete message based on at least one quality of service requirement at the UE.

In some examples, the configuration manager 1525 may be configured as or otherwise support a means for receiving, in the radio resource control reconfiguration complete message, a flag indicating that the UE is to apply the configuration in the radio resource control reconfiguration message.

Figure 16:
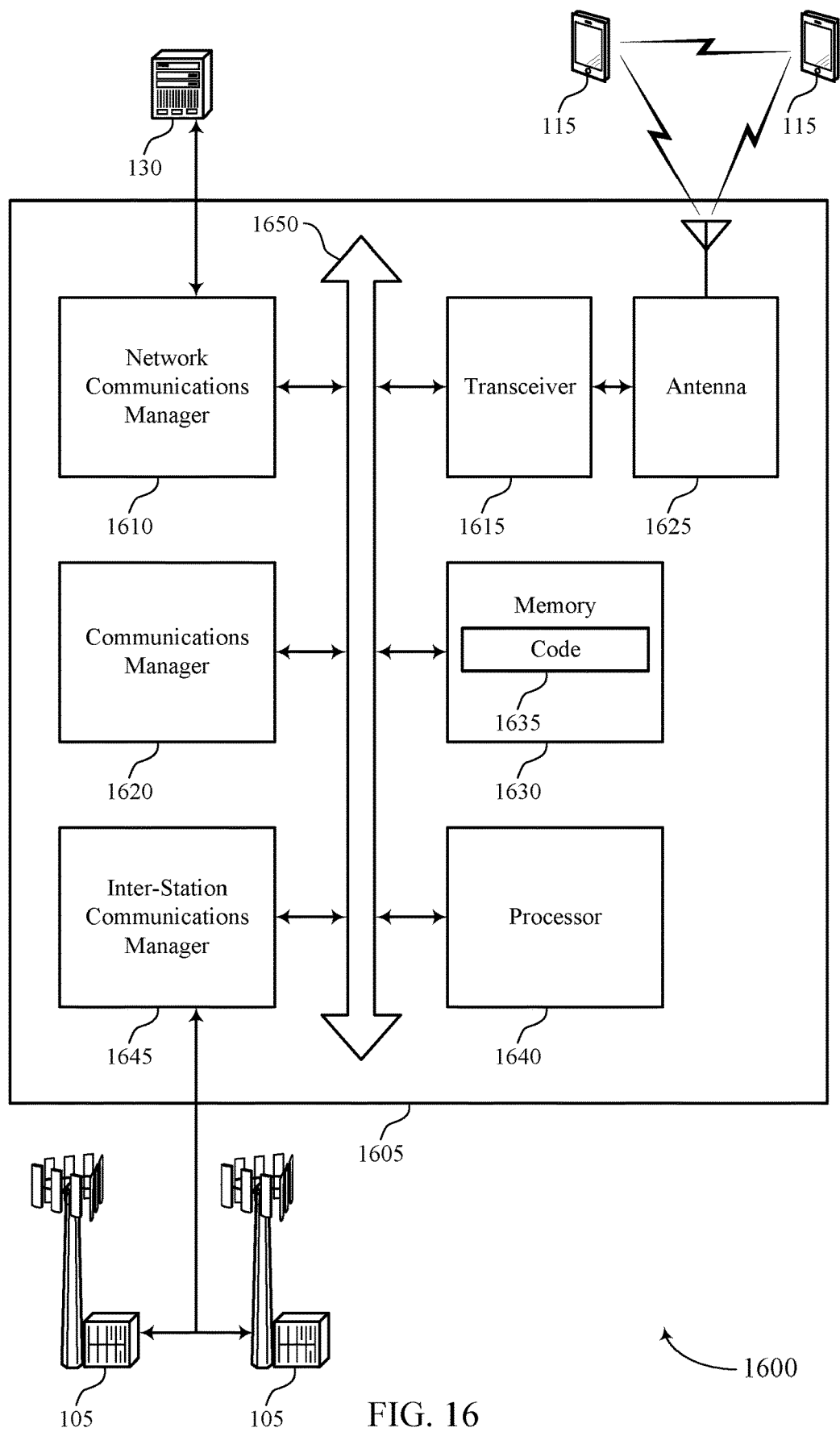
FIG. 16 shows a diagram of a system including a device that supports RRC action time in accordance with one or more aspects of the present disclosure.

FIG. 16 shows a diagram of a system 1600 including a device 1605 that supports RRC action time in accordance with one or more aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting RRC action time). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a base station in accordance with examples as disclosed herein. For example, the communications manager 1620 may be configured as or otherwise support a means for transmitting, to a UE, an indication to apply a configuration in a radio resource control reconfiguration message after the UE transmits a radio resource control reconfiguration complete message. The communications manager 1620 may be configured as or otherwise support a means for transmitting, to the UE, the radio resource control reconfiguration message including the configuration for communicating with the UE. The communications manager 1620 may be configured as or otherwise support a means for receiving, from the UE, a radio resource control reconfiguration complete message. The communications manager 1620 may be configured as or otherwise support a means for communicating with the UE using the configuration in the radio resource control reconfiguration message based on receiving the radio resource control reconfiguration complete message.

By including or configuring the communications manager 1620 in accordance with examples as described herein, the device 1605 may support techniques for reduced power consumption and more efficient utilization of communication resources. In particular, using the techniques described herein, a UE and a base station may be able to synchronize timing for applying an RRC configuration. As a result, there may be no or less ambiguity between the UE and the base station on when the RRC configuration is applied by the UE, and the UE and the base station may avoid communicating using different configurations or avoid suppressing communications due to ambiguity resulting in less wasted power and resources.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of RRC action time as described herein, or the processor 1640 and the memory 1630 may be otherwise configured to perform or support such operations.

Figure 17:
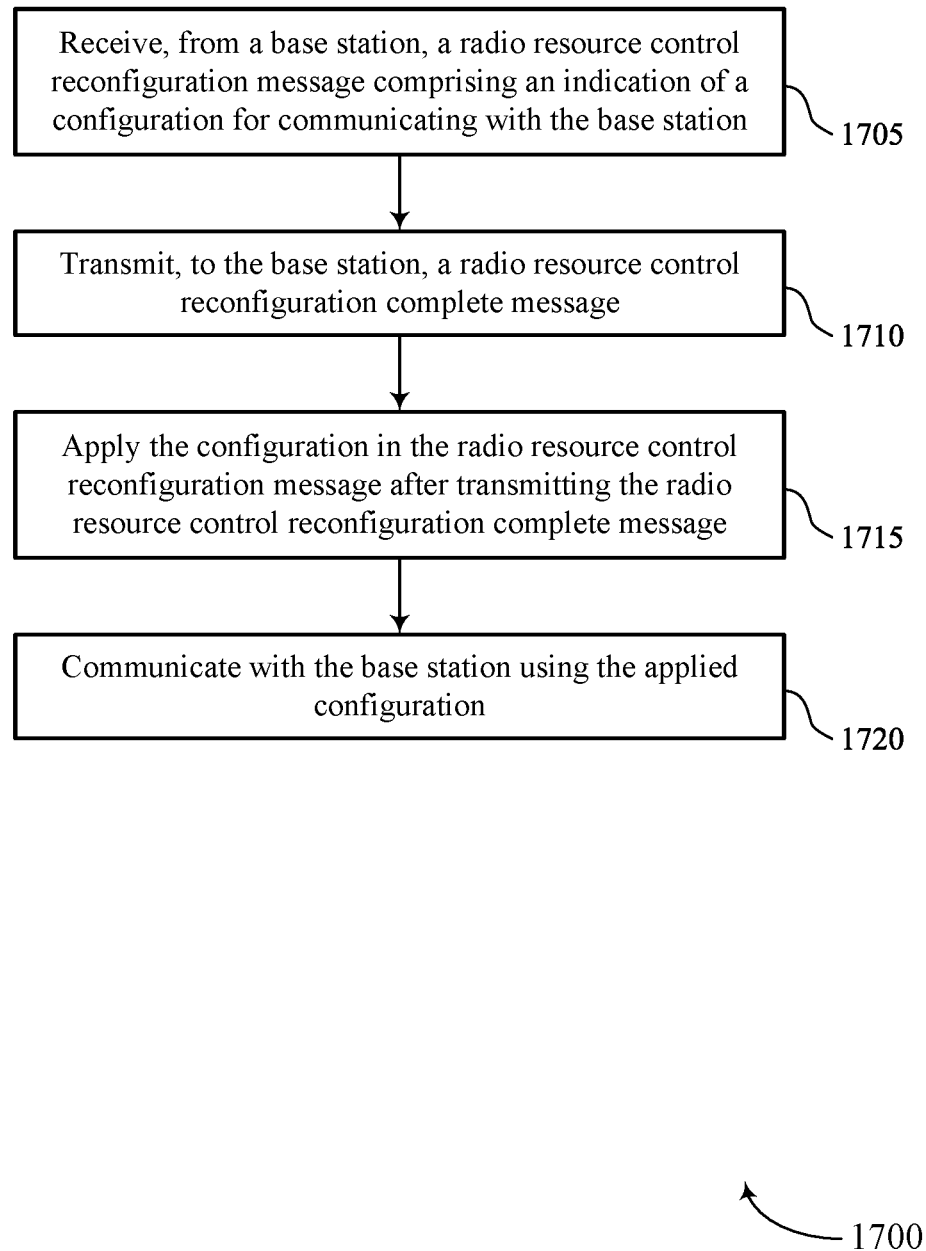
FIGS. 17 and 18 show flowcharts illustrating methods that support RRC action time in accordance with one or more aspects of the present disclosure.

FIG. 17 shows a flowchart illustrating a method 1700 that supports RRC action time in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving, from a base station, a radio resource control reconfiguration message including an indication of a configuration for communicating with the base station. The operations of 1705 may be performed in accordance with examples as disclosed herein. In some examples, aspects of the operations of 1705 may be performed by an RRC reconfiguration manager 1125 as described with reference to FIG. 11.

At 1710, the method may include transmitting, to the base station, a radio resource control reconfiguration complete message. The operations of 1710 may be performed in accordance with examples as disclosed herein. In some examples, aspects of the operations of 1710 may be performed by an RRC reconfiguration manager 1125 as described with reference to FIG. 11.

At 1715, the method may include applying the configuration in the radio resource control reconfiguration message after transmitting the radio resource control reconfiguration complete message. The operations of 1715 may be performed in accordance with examples as disclosed herein. In some examples, aspects of the operations of 1715 may be performed by a configuration manager 1130 as described with reference to FIG. 11.

At 1720, the method may include communicating with the base station using the applied configuration. The operations of 1720 may be performed in accordance with examples as disclosed herein. In some examples, aspects of the operations of 1720 may be performed by a configuration manager 1130 as described with reference to FIG. 11.

Figure 18:
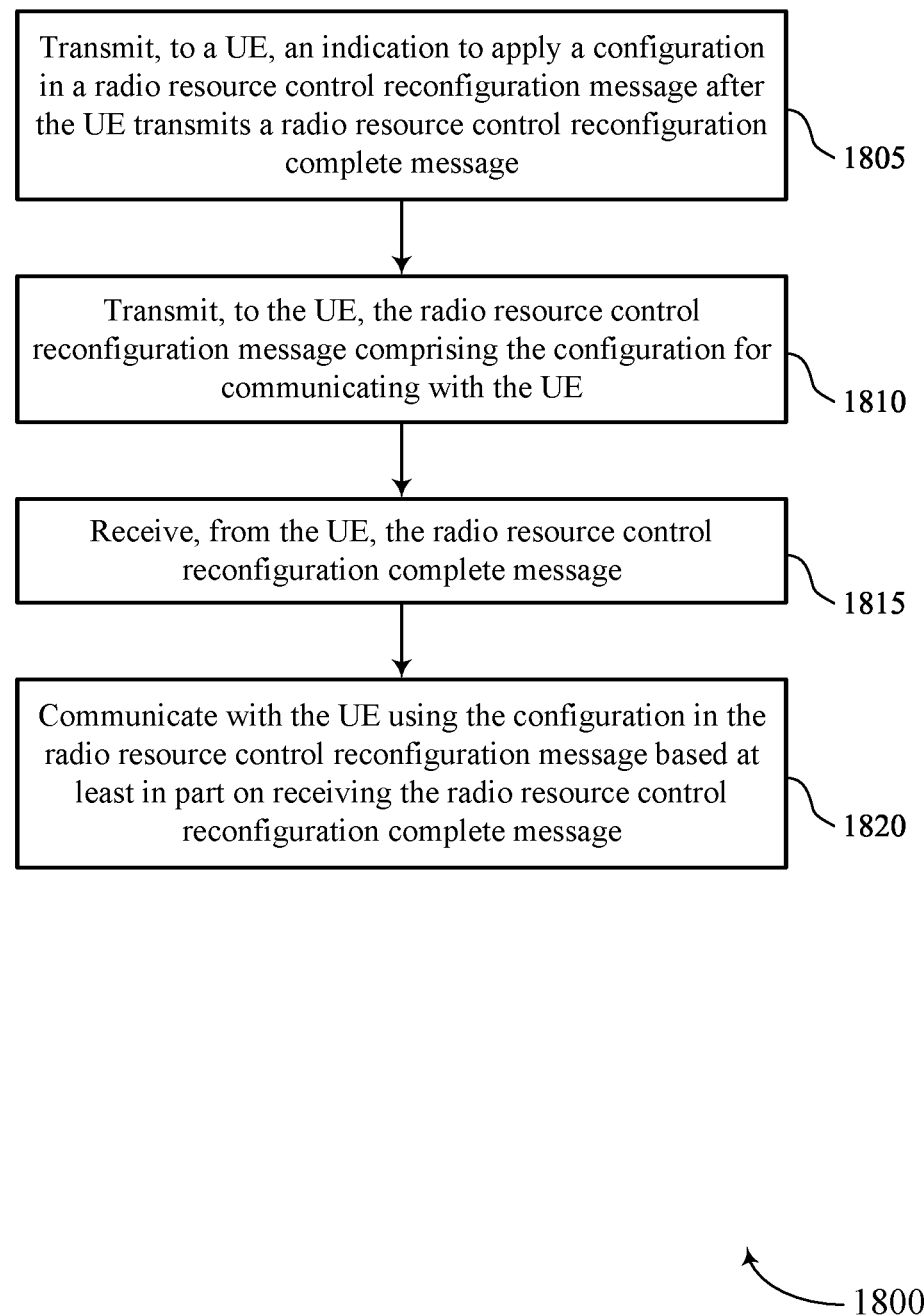

FIG. 18 shows a flowchart illustrating a method 1800 that supports RRC action time in accordance with one or more aspects of the present disclosure. The operations of the method 1800 may be implemented by a base station or its components as described herein. For example, the operations of the method 1800 may be performed by a base station 105 as described with reference to FIGS. 1 through 8 and 13 through 16. In some examples, a base station may execute a set of instructions to control the functional elements of the base station to perform the described functions. Additionally, or alternatively, the base station may perform aspects of the described functions using special-purpose hardware.

At 1805, the method may include transmitting, to a UE, an indication to apply a configuration in a radio resource control reconfiguration message after the UE transmits a radio resource control reconfiguration complete message. The operations of 1805 may be performed in accordance with examples as disclosed herein. In some examples, aspects of the operations of 1805 may be performed by a configuration manager 1525 as described with reference to FIG. 15.

At 1810, the method may include transmitting, to the UE, the radio resource control reconfiguration message including the configuration for communicating with the UE. The operations of 1810 may be performed in accordance with examples as disclosed herein. In some examples, aspects of the operations of 1810 may be performed by an RRC reconfiguration manager 1530 as described with reference to FIG. 15.

At 1815, the method may include receiving, from the UE, the radio resource control reconfiguration complete message. The operations of 1815 may be performed in accordance with examples as disclosed herein. In some examples, aspects of the operations of 1815 may be performed by an RRC reconfiguration manager 1530 as described with reference to FIG. 15.

At 1820, the method may include communicating with the UE using the configuration in the radio resource control reconfiguration message based on receiving the radio resource control reconfiguration complete message. The operations of 1820 may be performed in accordance with examples as disclosed herein. In some examples, aspects of the operations of 1820 may be performed by a configuration manager 1525 as described with reference to FIG. 15.

The following provides an overview of aspects of the present disclosure:

Aspect 1: A method for wireless communication at a UE, comprising: receiving, from a base station, a radio resource control reconfiguration message comprising an indication of a configuration for communicating with the base station; transmitting, to the base station, a radio resource control reconfiguration complete message; applying the configuration in the radio resource control reconfiguration message after transmitting the radio resource control reconfiguration complete message; and communicating with the base station using the applied configuration.

Aspect 2: The method of aspect 1, wherein applying the configuration comprises: waiting for a first time window to expire before applying the configuration; and applying the configuration in a second time window following the first time window, wherein the first time window and the second time window comprise a radio resource control window.

Aspect 3: The method of aspect 2, wherein a duration of the radio resource control window is based at least in part on a one-way propagation delay for transmissions from the UE to the base station plus a remaining radio resource control procedure delay.

Aspect 4: The method of aspect 3, further comprising: verifying that the configuration in the radio resource control reconfiguration message is compliant, wherein the remaining radio resource control procedure delay is equal to a radio resource control procedure delay minus a duration for verifying that the configuration is compliant.

Aspect 5: The method of any of aspects 2 through 4, wherein a duration of the radio resource control window is based at least in part on a one-way propagation delay for transmissions from the UE to the base station.

Aspect 6: The method of aspect 5, wherein a duration of the second time window is equal to a remaining radio resource control procedure delay.

Aspect 7: The method of any of aspects 1 through 6, wherein applying the configuration comprises: generating a first protocol stack using the configuration in the radio resource control reconfiguration message for communicating with the base station, wherein the first protocol stack replaces a second protocol stack generated using a previous configuration for communicating with the base station.

Aspect 8: The method of any of aspects 1 through 7, further comprising: transmitting, to the base station upon receiving the radio resource control reconfiguration message, an acknowledgment indicating that the radio resource control reconfiguration message is successfully received by the UE.

Aspect 9: The method of any of aspects 1 through 8, further comprising: receiving, from the base station, an indication to apply the configuration in the radio resource control reconfiguration message after transmitting the radio resource control reconfiguration complete message.

Aspect 10: The method of aspect 9, further comprising: transmitting, to the base station, an indication of a capability of the UE, wherein receiving the indication to apply the configuration after transmitting the radio resource control reconfiguration complete message is based at least in part on the capability of the UE.

Aspect 11: The method of any of aspects 9 through 10, further comprising: transmitting a request for the indication to apply the configuration after transmitting the radio resource control reconfiguration complete message based at least in part on at least one quality of service requirement at the UE.

Aspect 12: The method of any of aspects 1 through 11, further comprising: communicating with the base station using a previous configuration until the UE starts to apply the configuration in the radio resource control reconfiguration message.

Aspect 13: The method of aspect 12, wherein applying the configuration comprises: applying the configuration in the radio resource control reconfiguration message after a duration at the UE for processing the radio resource control reconfiguration message plus a one-way propagation delay for transmissions from the UE to the base station.

Aspect 14: The method of any of aspects 12 through 13, wherein applying the configuration comprises: applying the configuration in the radio resource control reconfiguration message after a one-way propagation delay for transmissions from the base station to the UE plus a maximum of a duration at the UE for processing the radio resource control reconfiguration message and a one-way propagation delay for transmissions from the UE to the base station.

Aspect 15: The method of any of aspects 12 through 14, wherein applying the configuration comprises: applying the configuration in the radio resource control reconfiguration message after a duration at the UE for processing the radio resource control reconfiguration message plus a one-way propagation delay for transmissions from the base station to the UE plus a one-way propagation delay for transmissions from the UE to the base station.

Aspect 16: The method of any of aspects 1 through 15, further comprising: verifying that the configuration in the radio resource control reconfiguration message is compliant; and transmitting, in the radio resource control reconfiguration complete message, a flag indicating that the UE is to apply the configuration in the radio resource control reconfiguration message.

Aspect 17: The method of aspect 16, wherein verifying that the configuration is compliant comprises: applying the configuration in the radio resource control reconfiguration message, the method further comprising: reverting to a previous configuration after verifying that the configuration is compliant.

Aspect 18: The method of any of aspects 16 through 17, wherein verifying that the configuration is compliant comprises: generating a first protocol stack using the configuration in the radio resource control reconfiguration message for communicating with the base station, wherein the first protocol stack replaces a second protocol stack generated using a previous configuration for communicating with the base station.

Aspect 19: The method of aspect 18, further comprising: communicating with the base station using the second protocol stack until a time that the configuration in the radio resource control reconfiguration message is applied; deleting the second protocol stack; and communicating with the base station using the first protocol stack after the time that the configuration in the radio resource control reconfiguration message is applied.

Aspect 20: The method of any of aspects 1 through 19, wherein the UE and the base station are operating in a non-terrestrial network.

Aspect 21: A method for wireless communication at a base station, comprising: transmitting, to a UE, an indication to apply a configuration in a radio resource control reconfiguration message after the UE transmits a radio resource control reconfiguration complete message; transmitting, to the UE, the radio resource control reconfiguration message comprising the configuration for communicating with the UE; receiving, from the UE, the radio resource control reconfiguration complete message; and communicating with the UE using the configuration in the radio resource control reconfiguration message based at least in part on receiving the radio resource control reconfiguration complete message.

Aspect 22: The method of aspect 21, further comprising: scheduling communications with the UE using a previous configuration in a first time window after transmitting the radio resource control reconfiguration message; and avoiding scheduling communications with the UE in a second time window following the first time window.

Aspect 23: The method of aspect 22, wherein a duration of the first time window is based at least in part on a one-way propagation delay for transmissions from the base station to the UE plus a remaining radio resource control procedure delay, and a duration of the second time window is based at least in part on a one-way propagation delay for transmissions between the UE to the base station minus the remaining radio resource control procedure delay.

Aspect 24: The method of aspect 23, wherein the remaining radio resource control procedure delay is equal to a radio resource control procedure delay minus a duration at the UE for verifying that the configuration is compliant.

Aspect 25: The method of any of aspects 22 through 24, wherein a duration of the first time window is based at least in part on a one-way propagation delay for transmissions from the base station to the UE, and a duration of the second time window is based at least in part on the one-way propagation delay for transmissions from the UE to the base station.

Aspect 26: The method of any of aspects 22 through 25, wherein a duration of the first time window is based at least in part on a duration at the UE for generating the radio resource control reconfiguration complete message, and a duration of the second time window is based at least in part on a one-way propagation delay for transmissions from the base station to the UE plus a one-way propagation delay for transmissions from the UE to the base station.

Aspect 27: The method of any of aspects 21 through 26, further comprising: communicating with UE using a previous configuration for a duration after transmitting the radio resource control reconfiguration message.

Aspect 28: The method of aspect 27, wherein the duration in which to communicate with the UE using the previous configuration comprises a duration at the UE for processing the radio resource control reconfiguration message plus a one-way propagation delay for transmissions from the UE to the base station.

Aspect 29: The method of any of aspects 27 through 28, wherein the duration in which to communicate with the UE using the previous configuration comprises a one-way propagation delay for transmissions from the base station to the UE plus a maximum of a duration at the UE for processing the radio resource control reconfiguration message and a one-way propagation delay for transmissions from the UE to the base station.

Aspect 30: The method of any of aspects 27 through 29, wherein the duration in which to communicate with the UE using the previous configuration comprises a duration at the UE for processing the radio resource control reconfiguration message plus a one-way propagation delay for transmissions from the base station to the UE plus a one-way propagation delay for transmissions from the UE to the base station.

Aspect 31: The method of any of aspects 21 through 30, further comprising: receiving, from the UE, an acknowledgment indicating that the radio resource control reconfiguration message is successfully received by the UE.

Aspect 32: The method of any of aspects 21 through 31, further comprising: receiving, from the UE, an indication of a capability of the UE, wherein transmitting the indication to apply the configuration after the UE transmits the radio resource control reconfiguration complete message is based at least in part on the capability of the UE.

Aspect 33: The method of any of aspects 21 through 32, further comprising: receiving, from the UE, a request for the indication to apply the configuration after the UE transmits the radio resource control reconfiguration complete message based at least in part on at least one quality of service requirement at the UE.

Aspect 34: The method of any of aspects 21 through 33, further comprising: receiving, in the radio resource control reconfiguration complete message, a flag indicating that the UE is to apply the configuration in the radio resource control reconfiguration message.

Aspect 35: An apparatus for wireless communication at a UE, comprising a processor; memory coupled to the processor, the processor and memory configured to perform a method of any of aspects 1 through 20.

Aspect 36: An apparatus for wireless communication at a UE, comprising at least one means for performing a method of any of aspects 1 through 20.

Aspect 37: A non-transitory computer-readable medium storing code for wireless communication at a UE, the code comprising instructions executable by a processor to perform a method of any of aspects 1 through 20.

Aspect 38: An apparatus for wireless communication at a base station, comprising a processor; memory coupled to the processor, the processor and memory configured to perform a method of any of aspects 21 through 34.

Aspect 39: An apparatus for wireless communication at a base station, comprising at least one means for performing a method of any of aspects 21 through 34.

Aspect 40: A non-transitory computer-readable medium storing code for wireless communication at a base station, the code comprising instructions executable by a processor to perform a method of any of aspects 21 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    one or more memories; and
    one or more processors coupled with the one or more memories and configured to cause the UE to:
       receive, from a network entity, a radio resource control reconfiguration message comprising an indication of a configuration for communicating with the network entity;
       transmit, to the network entity, a radio resource control reconfiguration complete message;
       apply the configuration in the radio resource control reconfiguration message after waiting a duration of a one-way propagation delay for transmission from the UE to the network entity and transmission of the radio resource control reconfiguration complete message; and
       communicate with the network entity using the applied configuration.

2. The apparatus of claim 1, wherein to apply the configuration, the one or more processors are configured to cause the UE to:
    wait for a first time window to expire before applying the configuration; and
    apply the configuration in a second time window following the first time window, wherein the first time window and the second time window comprise a radio resource control window.

3. The apparatus of claim 2, wherein a duration of the radio resource control window is based at least in part on the one-way propagation delay for transmission from the UE to the network entity plus a remaining radio resource control procedure delay.

4. The apparatus of claim 3, wherein the one or more processors are configured to cuase the UE to:
    verify that the configuration in the radio resource control reconfiguration message is compliant, wherein the remaining radio resource control procedure delay is equal to a radio resource control procedure delay minus a duration to verify that the configuration is compliant.

5. The apparatus of claim 2, wherein a duration of the radio resource control window is based at least in part on the one-way propagation delay for transmission from the UE to the network entity.

6. The apparatus of claim 5, wherein a duration of the second time window is equal to a remaining radio resource control procedure delay.

7. The apparatus of claim 1, wherein to apply the configuration, the one or more processors are configured to cause the UE to:
    generate a first protocol stack using the configuration in the radio resource control reconfiguration message for communicating with the network entity, wherein the first protocol stack replaces a second protocol stack generated using a previous configuration to communicate with the network entity.

8. The apparatus of claim 1, wherein the one more processors are configured to cause the UE to:
    transmit, to the network entity upon receiving the radio resource control reconfiguration message, an acknowledgment that indicates that the radio resource control reconfiguration message is successfully received by the UE.

9. The apparatus of claim 1, wherein the one or more processors are configured to cause the UE to:
    receive, from the network entity, an indication to apply the configuration in the radio resource control reconfiguration message after transmitting the radio resource control reconfiguration complete message.

10. The apparatus of claim 9, wherein one or more processors are configured to cause the UE to:
    transmit, to the network entity, an indication of a capability of the UE, wherein the indication to apply the configuration after transmitting the radio resource control reconfiguration complete message is based at least in part on the capability of the UE.

11. The apparatus of claim 9, wherein the one or more processors are configured to cause the UE to:
    transmit a request for the indication to apply the configuration after transmitting the radio resource control reconfiguration complete message based at least in part on at least one quality of service requirement at the UE.

12. The apparatus of claim 1, wherein the one or more processors are configured to cause the UE to:
    communicate with the network entity using a previous configuration until the UE starts to apply the configuration in the radio resource control reconfiguration message.

13. The apparatus of claim 12, wherein to apply the configuration, the one or more processors are configured to cause the UE to:
    apply the configuration in the radio resource control reconfiguration message after a duration at the UE to process the radio resource control reconfiguration message plus the one-way propagation delay for transmission from the UE to the network entity.

14. The apparatus of claim 12, wherein to apply the configuration, the one or more processors are configured to cause the UE to:
    apply the configuration in the radio resource control reconfiguration message after a one-way propagation delay for transmission from the network entity to the UE plus a maximum of a duration at the UE to process the radio resource control reconfiguration message and the one-way propagation delay for transmission from the UE to the network entity.

15. The apparatus of claim 12, wherein to apply the configuration, the one or more processors are configured to cause the UE to:
apply the configuration in the radio resource control reconfiguration message after a duration at the UE to process the radio resource control reconfiguration message plus a one-way propagation delay for transmission from the network entity to the UE plus the one-way propagation delay for transmission from the UE to the network entity.

16. The apparatus of claim 1, wherein the one or more processors are configured to cause the UE to:
verify that the configuration in the radio resource control reconfiguration message is compliant; and
transmit, in the radio resource control reconfiguration complete message, a flag that indicates that the UE is to apply the configuration in the radio resource control reconfiguration message.

17. The apparatus of claim 16, wherein to verify that the configuration is compliant, the one or more processors are configured to cause the UE to:
apply the configuration in the radio resource control reconfiguration message; and
revert to a previous configuration in response to a verification that the configuration is non-compliant.

18. The apparatus of claim 16, wherein to verify that the configuration is compliant, the one or more processors are configured to cause the UE to:
generate a first protocol stack using the configuration in the radio resource control reconfiguration message to communicate with the network entity, wherein the first protocol stack replaces a second protocol stack generated using a previous configuration to communicate with the network entity.

19. The apparatus of claim 18, wherein the one or more processors are configured to cause the UE to:
communicate with the network entity using the second protocol stack until a time that the configuration in the radio resource control reconfiguration message is applied;
delete the second protocol stack; and
communicate with the network entity using the first protocol stack after the time that the configuration in the radio resource control reconfiguration message is applied.

20. The apparatus of claim 1, wherein the UE and the network entity are operating in a non-terrestrial network.

21. An apparatus for wireless communication at a network entity, comprising:
one or more memories; and
one or more processors coupled with the one or more memories and configured to cause the network entity to:
transmit an indication to apply a configuration in a radio resource control reconfiguration message;
transmit to the UE, a radio resource control reconfiguration message comprising the configuration to communicate with a user equipment (UE);
receive a radio resource control reconfiguration complete message, wherein the radio resource control reconfiguration complete message is received after a duration of a one-way propagation delay for transmission from the UE to the network entity; and
communicate using the configuration in the radio resource control reconfiguration message based at least in part on receiving the radio resource control reconfiguration complete message.

22. The apparatus of claim 21, wherein the one or more processors are configured to cause the network entity to:
schedule communications with the UE using a previous configuration in a first time window after transmitting the radio resource control reconfiguration message; and
avoid scheduling communications with the UE in a second time window following the first time window.

23. The apparatus of claim 22, wherein a duration of the first time window is based at least in part on a one-way propagation delay for transmission from the network entity to the UE plus a remaining radio resource control procedure delay, and a duration of the second time window is based at least in part on a one-way propagation delay for transmission between the UE to the network entity minus the remaining radio resource control procedure delay.

24. The apparatus of claim 23, wherein the remaining radio resource control procedure delay is equal to a radio resource control procedure delay minus a duration at the UE to verify that the configuration is compliant.

25. The apparatus of claim 22, wherein a duration of the first time window is based at least in part on a one-way propagation delay for transmission from the network entity to the UE, and a duration of the second time window is based at least in part on the one-way propagation delay for transmission from the UE to the network entity.

26. The apparatus of claim 22, wherein a duration of the first time window is based at least in part on a duration at the UE to generate the radio resource control reconfiguration complete message, and a duration of the second time window is based at least in part on a one-way propagation delay for transmission from the network entity to the UE plus the one-way propagation delay for transmission from the UE to the network entity.

27. The apparatus of claim 21, wherein the one or more processors are configured to cause the network entity to:
communicate with UE using a previous configuration for a second duration after transmitting the radio resource control reconfiguration message.

28. The apparatus of claim 27, wherein the duration in which to communicate with the UE using the previous configuration comprises a duration at the UE to process the radio resource control reconfiguration message plus the one-way propagation delay for transmission from the UE to the network entity.

29. A method for wireless communication at a user equipment (UE), comprising:
receiving, from a network entity, a radio resource control reconfiguration message comprising an indication of a configuration for communicating with the network entity;
transmitting, to the network entity, a radio resource control reconfiguration complete message;
applying the configuration in the radio resource control reconfiguration message after waiting a duration of a one-way propagation delay for transmission from the UE to the network entity and transmitting the radio resource control reconfiguration complete message; and
communicating with the network entity using the applied configuration.

30. The method of claim 29, wherein to apply the configuration further comprises:
waiting for a first time window to expire before applying the configuration; and applying the configuration in a second time window following the first time window, wherein the first time window and the second time window comprise a radio resource control window.

31. The method of claim 30, wherein a duration of the radio resource control window is based at least in part on the one-way propagation delay for transmission from the UE to the network entity plus a remaining radio resource control procedure delay.

32. The method of claim 30, wherein a duration of the radio resource control window is based at least in part on the one-way propagation delay for transmission from the UE to the network entity.

33. The method of claim 29, wherein to apply the configuration further comprises:
generating a first protocol stack using the configuration in the radio resource control reconfiguration message for communicating with the network entity, wherein the first protocol stack replaces a second protocol stack generated using a previous configuration to communicate with the network entity.

34. The method of claim 29, further comprising:
transmitting, to the network entity upon receiving the radio resource control reconfiguration message, an acknowledgment that indicates that the radio resource control reconfiguration message is successfully received by the UE.

35. The method of claim 29, further comprising:
receiving, from the network entity, an indication to apply the configuration in the radio resource control reconfiguration message after transmitting the radio resource control reconfiguration complete message.

36. The method of claim 29, further comprising:
communicating with the network entity using a previous configuration until the UE starts to apply the configuration in the radio resource control reconfiguration message.

37. The method of claim 29, further comprising:
verifying that the configuration in the radio resource control reconfiguration message is compliant; and
transmitting, in the radio resource control reconfiguration complete message, a flag that indicates that the UE is to apply the configuration in the radio resource control reconfiguration message.

38. The method of claim 29, wherein the UE and the network entity are operating in a non-terrestrial network.

39. A method for wireless communication at a network entity, comprising:
transmitting an indication to apply a configuration in a radio resource control reconfiguration message;
transmitting the radio resource control reconfiguration message comprising the configuration for communicating with a user equipment (UE);
receiving a radio resource control reconfiguration complete message, wherein the radio resource control reconfiguration complete message is received after a duration of a one-way propagation delay for transmission from the UE to the network entity; and
communicating using the configuration in the radio resource control reconfiguration message based at least in part on receiving the radio resource control reconfiguration complete message.

40. The method of claim 39, comprising:
scheduling communications with the UE using a previous configuration in a first time window after transmitting the radio resource control reconfiguration message; and avoiding scheduling communications with the UE in a second time window following the first time window.

41. The method of claim 40, wherein a duration of the first time window is based at least in part on a one-way propagation delay for transmission from the network entity to the UE plus a remaining radio resource control procedure delay, and a duration of the second time window is based at least in part on a one-way propagation delay for transmission between the UE to the network entity minus the remaining radio resource control procedure delay.

42. The method of claim 41, wherein the remaining radio resource control procedure delay is equal to a radio resource control procedure delay minus a duration at the UE to verify that the configuration is compliant.

43. The method of claim 40, wherein a duration of the first time window is based at least in part on a one-way propagation delay for transmission from the network entity to the UE, and a duration of the second time window is based at least in part on the one-way propagation delay for transmission from the UE to the network entity.

44. The method of claim 40, wherein a duration of the first time window is based at least in part on a duration at the UE to generate the radio resource control reconfiguration complete message, and a duration of the second time window is based at least in part on a one-way propagation delay for transmission from the network entity to the UE plus the one-way propagation delay for transmission from the UE to the network entity.

45. The method of claim 39, further comprising:
communicate with UE using a previous configuration for a second duration after transmitting the radio resource control reconfiguration message.

46. The method of claim 45, wherein the duration in which to communicate with the UE using the previous configuration comprises a duration at the UE to process the radio resource control reconfiguration message plus the one-way propagation delay for transmission from the UE to the network entity.

47. A non-transitory computer-readable medium storing code for wireless communication at a user equipment (UE), the code comprising instructions executable by one or more processors to cause the UE to:
receive, from a network entity, a radio resource control reconfiguration message comprising an indication of a configuration for communicating with the network entity;
transmit, to the network entity, a radio resource control reconfiguration complete message;
apply the configuration in the radio resource control reconfiguration message after waiting a duration of a one-way propagation delay for transmission from the UE to the network entity and transmitting the radio resource control reconfiguration complete message; and
communicate with the network entity using the applied configuration.

48. The non-transitory computer-readable medium of claim 47, wherein the instructions to apply the configuration are executable by the one or more processors to cause the UE to:
wait for a first time window to expire before applying the configuration; and
apply the configuration in a second time window following the first time window, wherein the first time window and the second time window comprise a radio resource control window.

49. The non-transitory computer-readable medium of claim 48, wherein a duration of the radio resource control window is based at least in part on the one-way propagation delay for transmission from the UE to the network entity plus a remaining radio resource control procedure delay.

50. The non-transitory computer-readable medium of claim 49, wherein the instructions to apply the configuration are executable by one or more processors to cause the UE to:
verify that the configuration in the radio resource control reconfiguration message is compliant, wherein the remaining radio resource control procedure delay is equal to a radio resource control procedure delay minus a duration for verifying that the configuration is compliant.

51. The non-transitory computer-readable medium of claim 48, wherein a duration of the radio resource control window is based at least in part on the one-way propagation delay for transmission from the UE to the network entity.

52. A non-transitory computer-readable medium storing code for wireless communication at a network entity, the code comprising instructions executable by one or more processors to cause the network entity to:
transmit an indication to apply a configuration in a radio resource control reconfiguration message;
transmit a radio resource control reconfiguration message comprising the configuration for communicating with a user equipment (UE);
receive a radio resource control reconfiguration complete message, wherein the radio resource control reconfiguration complete message is received after a duration of a one-way propagation delay for transmission from the UE to the network entity; and
communicate using the configuration in the radio resource control reconfiguration message based at least in part on receiving the radio resource control reconfiguration complete message.

53. The non-transitory computer-readable medium of claim 52, wherein the instructions are further executable by one or more processors to cause the network entity to:
schedule communications with the UE using a previous configuration in a first time window after transmitting the radio resource control reconfiguration message; and
avoid scheduling communications with the UE in a second time window following the first time window.

54. The non-transitory computer-readable medium of claim 53, wherein a duration of the first time window is based at least in part on a one-way propagation delay for transmission from the network entity to the UE plus a remaining radio resource control procedure delay, and a duration of the second time window is based at least in part on a one-way propagation delay for transmission between the UE to the network entity minus the remaining radio resource control procedure delay.

55. The non-transitory computer-readable medium of claim 54, wherein the remaining radio resource control procedure delay is equal to a radio resource control procedure delay minus a duration at the UE for verifying that the configuration is compliant.

56. The non-transitory computer-readable medium of claim 53, wherein a duration of the first time window is based at least in part on a one-way propagation delay for transmission from the network entity to the UE, and a duration of the second time window is based at least in part on the one-way propagation delay for transmission from the UE to the network entity.

* * * * *